US008149799B2

(12) United States Patent
Rofougaran

(10) Patent No.: US 8,149,799 B2
(45) Date of Patent: Apr. 3, 2012

(54) METHOD AND SYSTEM FOR INTERFACING TO A PLURALITY OF ANTENNAS

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1326 days.

(21) Appl. No.: 11/536,650

(22) Filed: Sep. 29, 2006

(65) Prior Publication Data

US 2008/0080451 A1    Apr. 3, 2008

(51) Int. Cl.
*H04W 4/00* (2009.01)

(52) U.S. Cl. ........ 370/338; 370/342; 370/337; 455/450; 455/555

(58) Field of Classification Search .................. 370/294, 370/302, 321, 330, 337, 347, 342, 247; 455/552.1, 455/550, 551, 552, 553, 553.1, 41.2, 41.3, 455/63.1, 67.13, 501, 450, 555
See application file for complete search history.

(56) References Cited

U.S. PATENT DOCUMENTS

| | | | | |
|---|---|---|---|---|
| 3,618,105 A | * | 11/1971 | Bruene et al. .................. | 343/747 |
| 4,398,196 A | * | 8/1983 | Wiegand ........................ | 342/192 |
| 5,426,641 A | * | 6/1995 | Afrashteh et al. ............. | 370/347 |
| 5,566,168 A | * | 10/1996 | Dent .............................. | 370/323 |
| 5,832,044 A | * | 11/1998 | Sousa et al. .................... | 375/347 |
| 5,878,332 A | * | 3/1999 | Wang et al. ..................... | 455/84 |
| 6,112,062 A | * | 8/2000 | Hans et al. .................. | 455/114.3 |
| 6,138,010 A | * | 10/2000 | Rabe et al. .................. | 455/426.1 |
| 6,144,653 A | * | 11/2000 | Persson et al. ................ | 370/337 |
| 6,788,917 B1 | * | 9/2004 | Refai et al. .................... | 455/12.1 |
| 2001/0031621 A1 | * | 10/2001 | Schmutz ............................ | 455/7 |
| 2002/0136231 A1 | * | 9/2002 | Leatherbury et al. ......... | 370/442 |
| 2002/0186167 A1 | * | 12/2002 | Anderson ...................... | 342/465 |
| 2003/0078037 A1 | * | 4/2003 | Auckland et al. ............. | 455/422 |
| 2003/0219035 A1 | | 11/2003 | Schmidt | |
| 2004/0136473 A1 | * | 7/2004 | Yang et al. ..................... | 375/322 |
| 2004/0208157 A1 | * | 10/2004 | Sander et al. ................. | 370/345 |

(Continued)

FOREIGN PATENT DOCUMENTS

CN    1124076 A    6/1996

(Continued)

OTHER PUBLICATIONS

EPO Communication dated Mar. 31, 2011 in Application No. 07006998.4-1246 / 1906540.

*Primary Examiner* — Pierre-Louis Desir
(74) *Attorney, Agent, or Firm* — Farjami & Farjami LLP

(57) ABSTRACT

A method and system for interfacing to a plurality of antennas is provided. The method may comprise scheduling signals within different frequency ranges communicated from different antennas to use different timeslots in a TDM frame, such as a GSM frame. A plurality of antennas may be used, and at least one high frequency antenna may be adapted to operate at frequencies above 700 MHz and at least one low frequency antenna may be adapted to operate at frequencies below 700 MHz. The high frequency antenna may support WCDMA, HDSPA, HSUPA, GSM, GPRS, EDGE, Wi-Fi, Bluetooth, GPS, and/or DVB communication. The low frequency antenna may support FM or NFC. NFC may be enabled by applying a DC bias voltage to the low frequency antenna. The method may also comprise dynamically tuning the antennas to frequency bands corresponding to particular communication protocols. The dynamic tuning may further comprise compensating the antennas for changes in frequency.

30 Claims, 15 Drawing Sheets

U.S. PATENT DOCUMENTS

| | | |
|---|---|---|
| 2005/0020299 A1* | 1/2005 | Malone et al. ............ 455/552.1 |
| 2005/0128978 A1* | 6/2005 | Pecen et al. ................ 370/329 |
| 2005/0141452 A1* | 6/2005 | Vancraeynest ............. 370/329 |
| 2005/0197095 A1* | 9/2005 | Nakamata et al. ........... 455/403 |
| 2005/0243748 A1* | 11/2005 | Bosch et al. ................. 370/310 |
| 2006/0057995 A1* | 3/2006 | Chien ......................... 455/260 |
| 2006/0068837 A1 | 3/2006 | Malone |
| 2006/0084469 A1 | 4/2006 | Malone et al. |
| 2006/0154617 A1 | 7/2006 | Clingman et al. |
| 2006/0245474 A1* | 11/2006 | Brunel et al. ................ 375/146 |
| 2006/0248225 A1* | 11/2006 | Batz et al. ................... 709/238 |
| 2006/0262741 A1* | 11/2006 | Niemela ...................... 370/319 |
| 2006/0280142 A1* | 12/2006 | Damnjanovic et al. ....... 370/329 |
| 2007/0001813 A1* | 1/2007 | Maguire et al. ............. 340/10.2 |
| 2007/0030208 A1* | 2/2007 | Linehan ....................... 343/757 |
| 2007/0060071 A1* | 3/2007 | Rafi et al. ........................ 455/76 |
| 2007/0232232 A1* | 10/2007 | Matsuo et al. ............... 455/41.1 |
| 2007/0238483 A1* | 10/2007 | Boireau et al. ............. 455/553.1 |
| 2007/0241979 A1* | 10/2007 | Yang ........................... 343/765 |
| 2007/0259628 A1* | 11/2007 | Carmel et al. ............. 455/127.1 |
| 2007/0280262 A1* | 12/2007 | Larsen et al. ........... 370/395.21 |
| 2008/0007333 A1* | 1/2008 | Lee et al. ..................... 330/136 |

FOREIGN PATENT DOCUMENTS

| | | |
|---|---|---|
| CN | 1199996 A | 11/1998 |
| CN | 1663122 A | 8/2005 |
| KR | 1020040006398 | 1/2004 |

* cited by examiner

METHOD AND SYSTEM FOR INTERFACING TO A PLURALITY OF ANTENNAS

CROSS-REFERENCE TO RELATED APPLICATIONS/INCORPORATION BY REFERENCE

In addition, this application makes reference to:
U.S. application Ser. No. 11/536,678, filed on even date herewith;
U.S. application Ser. No. 11/536,682, filed on even date herewith;
U.S. application Ser. No. 11/536,644, filed on even date herewith;
U.S. application Ser. No. 11/536,676, filed on even date herewith;
U.S. application Ser. No. 11/536,659, filed on even date herewith;
U.S. application Ser. No. 11/536,673, filed on even date herewith;
U.S. application Ser. No. 11/536,679, filed on even date herewith;
U.S. application Ser. No. 11/536,670, filed on even date herewith;
U.S. application Ser. No. 11/536,672, filed on even date herewith;
U.S. application Ser. No. 11/536,648, filed on even date herewith;
U.S. application Ser. No. 11/536,669, filed on even date herewith;
U.S. application Ser. No. 11/536,666, filed on even date herewith;
U.S. application Ser. No. 11/536,675, filed on even date herewith;
U.S. application Ser. No. 11/536,685, filed on even date herewith;
U.S. application Ser. No. 11/536,645, filed on even date herewith;
U.S. application Ser. No. 11/536,655, filed on even date herewith;
U.S. application Ser. No. 11/536,660, filed on even date herewith;
U.S. application Ser. No. 11/536,657, filed on even date herewith;
U.S. application Ser. No. 11/536,662, filed on even date herewith;
U.S. application Ser. No. 11/536,688, filed on even date herewith;
U.S. application Ser. No. 11/536,667, filed on even date herewith;
U.S. application Ser. No. 11/536,651, filed on even date herewith;
U.S. application Ser. No. 11/536,656, filed on even date herewith; and
U.S. application Ser. No. 11/536,663, filed on even date herewith.

The above stated applications are hereby incorporated herein by reference in their entirety.

FIELD OF THE INVENTION

Certain embodiments of the invention relate to wireless communication systems. More specifically, certain embodiments of the invention relate to a method and system for interfacing to a plurality of antennas.

BACKGROUND OF THE INVENTION

As competition in the mobile device business has increased, manufacturers of mobile devices may have found themselves struggling to differentiate their respective products. Although mobile device styling may have been the preferred way of attracting consumers, manufactures are increasingly turning to adding additional features. For example, at one time a cellular telephone was only used for voice communication. But today, cellular telephones may be more akin to computers. Many run familiar applications such as calendar and email applications. Additionally, some cellular telephones include hardware and software to support GPS navigation and hands-free capability. The last two features may require the cellular telephone to support communication protocols other than the standard cellular telephone protocols.

Supporting more and more communication protocols may increase the cost and size of mobile devices. For example, the hands-free capability described above may conform to a Bluetooth standard and therefore may require additional software and hardware, to support Bluetooth functionality. For example additional PLLs, filters and power amplifiers may be needed. The GPS capabilities described above may also require dedicated hardware and software.

In addition, to cost and size, the power consumption of these mobile devices may increase as well because the extra components may consume power even when not used. For example, various PLLs corresponding to various communication protocols may be operating even though no transmission may be occurring using those communication protocols.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for interfacing to a plurality of antennas, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for interfacing to a plurality of antennas. The method may comprise scheduling signals within different frequency ranges communicated from different antennas to use different timeslots in a TDM frame, such as a GSM frame. A plurality of antennas may be used, and at least one high frequency antenna may be adapted to operate at frequencies above 700 MHz and at least one low frequency antenna may be adapted to operate at frequencies below 700 MHz. The high frequency antenna may support WCDMA, HDSPA, HSUPA, GSM, GPRS, EDGE, Wi-Fi, Bluetooth, GPS, and/or DVB communication. The low frequency antenna may support FM or NFC. NFC may be enabled by applying a DC bias voltage to the low frequency antenna. The method may also comprise dynamically tuning the antennas to frequency bands corresponding to particular communication protocols. The dynamic tuning may further comprise compensating the antennas for changes in frequency.

Figure 1:
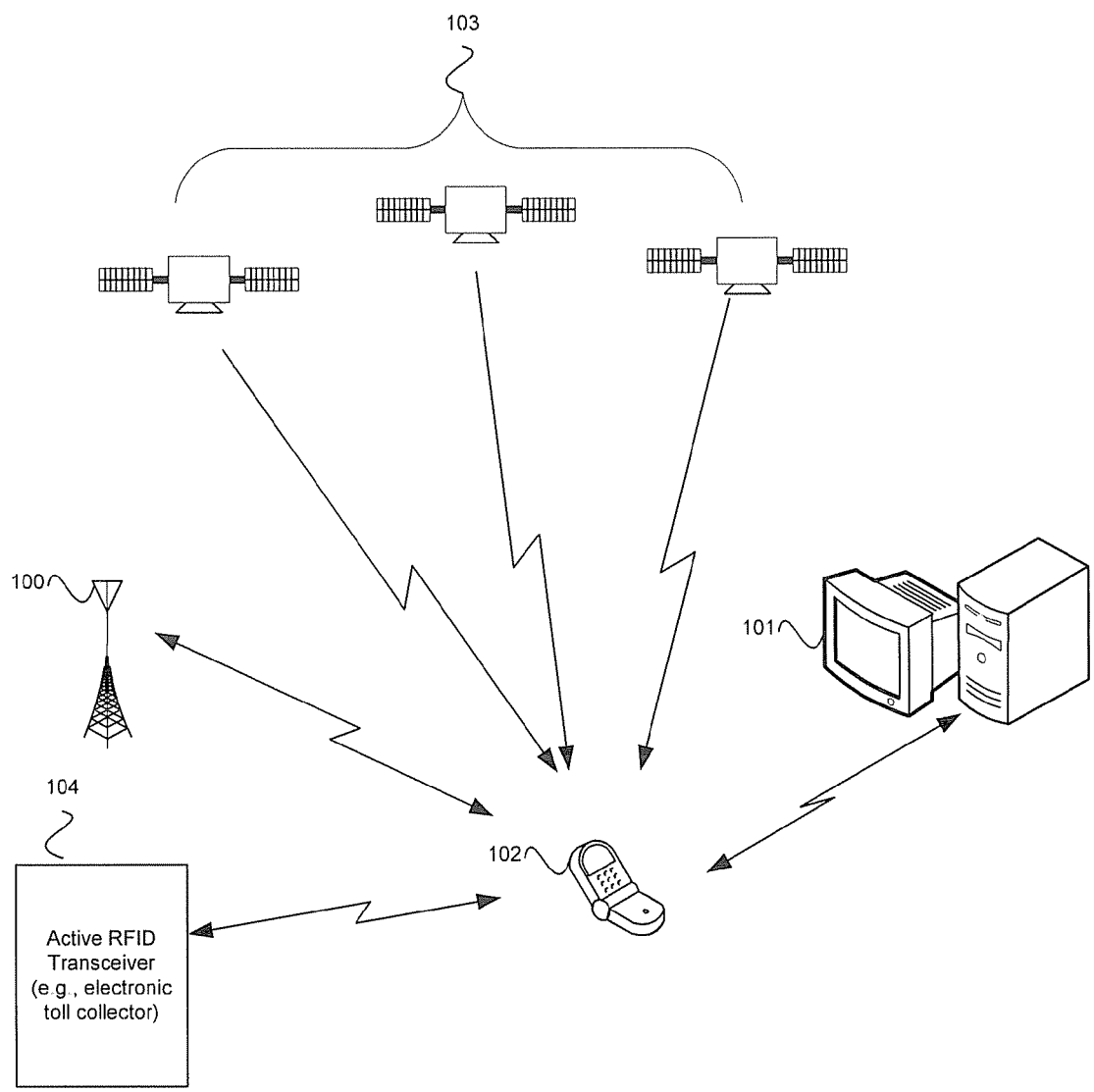
FIG. 1 is a block diagram of an exemplary mobile device communicating with a plurality of wireless systems, in accordance with an embodiment of the invention.

FIG. 1 is a block diagram of an exemplary mobile device communicating with a plurality of wireless systems, in accordance with an embodiment of the invention. Referring to FIG. 1, there is shown an RFID transceiver 104, a cellular telephone tower 100, a satellite communication system 103, a computer 101, and a mobile device 102. The RFID transceiver 104 may comprise suitable logic, circuitry, and/or code that may enable near field communication (NFC) with a mobile device. For example, the RFID transceiver 104 may be implemented as part of an electronic toll collection application in which the RFID transceiver 104 may be located at a toll plaza. In this regard, a mobile device 102 that support NFC may, for example, be used to authorize toll payments.

The cellular telephone tower 100 may comprise suitable logic, circuitry, and or code that may enable transmitting information to and receiving information from a mobile device 102. In this regard, the cellular telephone tower 100 may transmit and receive information utilizing a TDMA communication protocol, such as GSM. In this regard, information may be communicated to the mobile device 102 during timeslots. For example, one timeslot may be used to receive information from the mobile device 102 and the other may be used to transmit information to the mobile device 102. Other timeslots may be used to communicate with other mobile devices.

The satellite communication system 103 may comprise suitable logic, circuitry, and/or code that may enable a mobile device to determine its location on earth. For example, the satellite communication system 103 may be comprised of a plurality of satellites all working in concert so that a mobile device 102 may triangulate its position. In this regard, the satellite communication system 103 may be a global positioning satellite (GPS) system.

The computer 101 may comprise suitable logic, circuitry, and or code that may enable communicating data utilizing a variety of communication protocols. For example, the computer 101 may communicate data utilizing a WLAN protocol, such as 802.11, or a Bluetooth protocol. In this regard, the computer 101 may utilize these protocols to communicate to a mobile device 102. For example, the computer 101 may discover and make itself accessible to the mobile device 102. The mobile device 102 may then initiate a data transfer to the computer 101. For example, the mobile device 102 may transfer information stored in a subscriber identity module (SIM), such as an address book, to the computer utilizing one of the protocols.

The mobile device 102 may comprise suitable logic, circuitry, and/or code that may enable receiving and transmitting information utilizing a plurality of communication protocols. For example, the mobile device 102 may utilize a time division multiple access (TDMA) protocol, such as GSM, to handle voice and/or data calls. In this regard, the mobile device 102 may utilize two timeslots within a GSM frame to communicate voice data to a cellular telephone tower 100. The mobile device 102 may communicate to other devices utilizing other communication protocols during unused timeslots. For example, the mobile device 102 may communicate to a computer 101 utilizing a Bluetooth protocol. The mobile device 102 may also receive information, such as GPS satellite information during other timeslots as well. The mobile device 102 may also be enabled to receive NFC signals from an RFID transceiver 104.

Utilizing unused timeslots to communicate information may enable more efficient use of the resources within the mobile device 102. For example, a common antenna may be utilized to support a plurality of communication protocols by matching the antenna to the particular frequencies utilized by the communication protocol. In this regard, the antenna may be matched to frequencies corresponding to GSM RX operation during a first timeslot. During other timeslots where GSM operation may not be required, the antenna may be matched to other communication protocols, such as Bluetooth. Therefore, one antenna may be used to support the two protocols.

Figure 2:
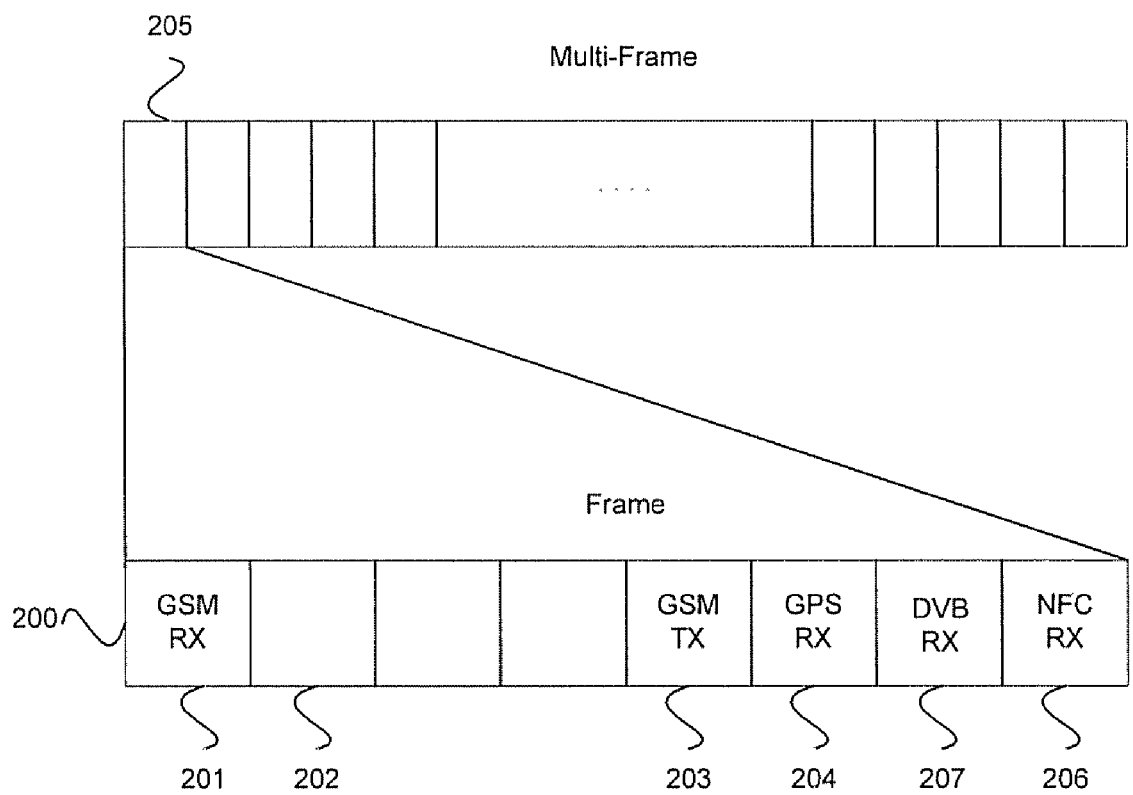
FIG. 2 is a block diagram of an exemplary time slot arrangement, in accordance with an embodiment of the invention.

FIG. 2 is a block diagram of an exemplary time slot arrangement, in accordance with an embodiment of the invention. Referring to FIG. 2, there is shown a multi-frame 205, a single frame 200, a GSM RX timeslot 201, a GSM TX timeslot 203, a Bluetooth TX timeslot 202, a GPS RX timeslot 204, a DVB RX timeslot 207, and a NFC RX timeslot 206. The multi-frame 205 may conform to the GSM standard described above. In this regard, the multi-frame 205 may comprise 26 frames, where the length of each frame may be 4.16 milliseconds. Some of the frames within the multi-frame may be used to communicate data to a mobile device 102 (FIG. 1).

The single frame 200 may be one of a plurality of frames in the multi-frame 205. The single frame 200 may be divided into, for example, eight (8) timeslots. A mobile device 102 may communicate utilizing a plurality of communication protocols within the single frame 200. For example, the mobile device 102 may receive information from a cellular telephone tower 100 (FIG. 1) during the GSM RX timeslot 201 and may transmit information to a cellular telephone tower 100 during the GSM TX timeslot 203. During other timeslots, the mobile device 102 may be configured to communicate using other communication protocols. For example, the mobile device 102 may be configured to communicate to a computer using, for example a Bluetooth transmission system during the Bluetooth TX slot 202. The mobile terminal may also be configured to receive signals from a plurality of satellites during the GPS RX time slot 204. The mobile terminal may also be configured to receive signals from a radio broadcast station during the NFC RX time slot 206.

Figure 3A:
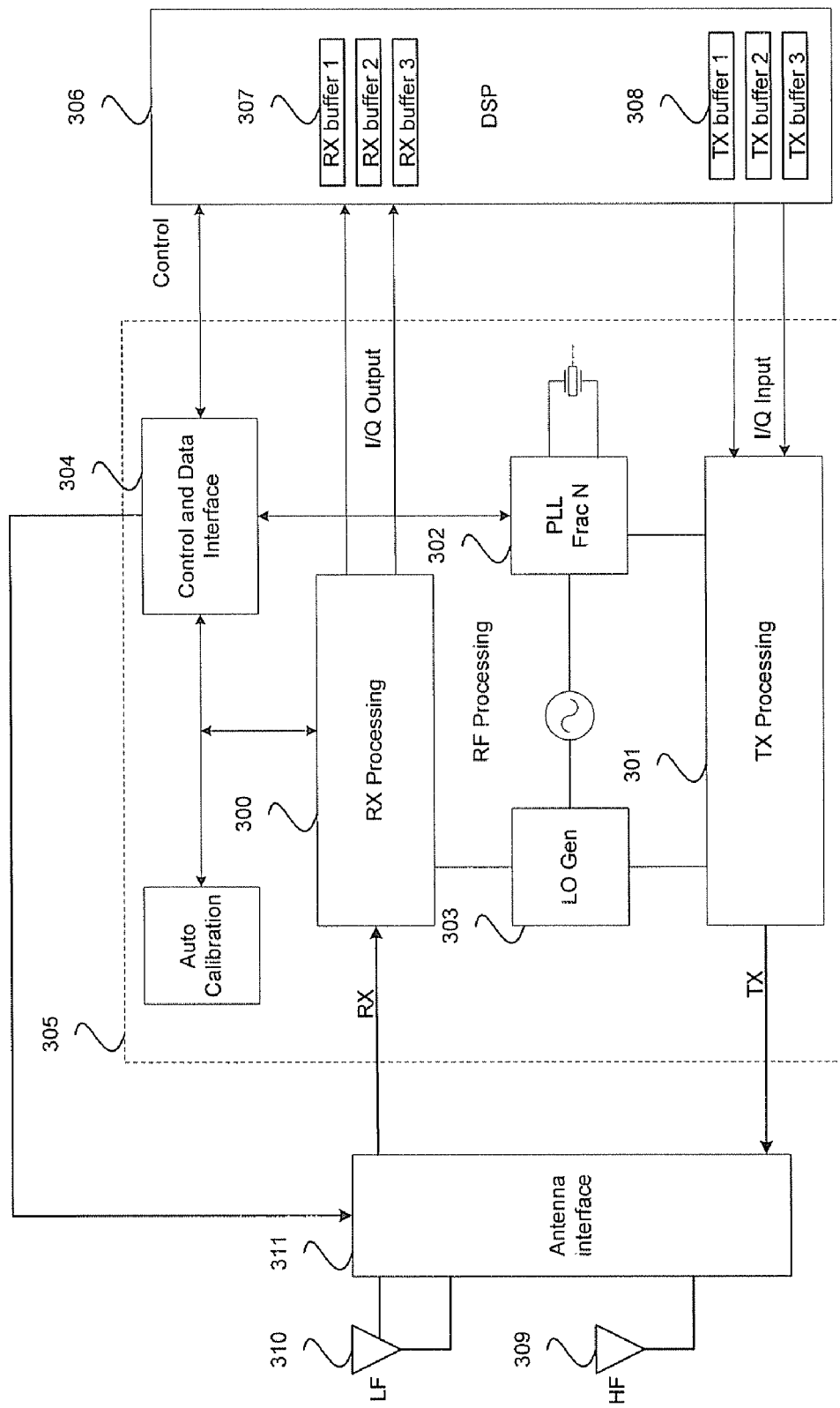
FIG. 3A is a block diagram of an exemplary system for sharing components in a time division multiplex wireless system, in accordance with an embodiment of the invention.

FIG. 3A is a block diagram of an exemplary system for sharing components in a time division multiplex wireless system, in accordance with an embodiment of the invention. Referring to FIG. 3A, there is shown a software definable radio (SDR) 305, a DSP 306, an antenna interface 311, and two antennas 309 and 310. The SDR 305 may comprise a RX processing system 300, a TX processing system 301, a PLL 302, an oscillator 303, and a control block 304. The DSP 306 may comprise receive buffers 307 and transmit buffers 308.

The RX processing system 300 may comprise suitable logic, code, and/or circuitry that may enable receiving RF signals corresponding to a plurality of communication protocols. For example, the RX processing system 300 may be adapted to receive TDMA transmissions, such as GSM. The RX processing system 300 may be further adapted to receive other forms of transmissions, for example, Bluetooth, WLAN, and GPS. In this regard, the RX processing system 300 may comprise a plurality of filters, which may be tailored so that the selected transmission may be properly received. For example, the RX processing system 300 may comprise a band pass filter that may in one instance be centered around a carrier frequency associated with, for example, a cellular telephone tower 100 (FIG. 1), and in another instance may be centered around a carrier frequency associated with a Bluetooth signal from a computer 101 (FIG. 1). In this regard, the RX processing system 300 may be capable of receiving RF signals corresponding to one communication protocol in one timeslot and another communication protocol in another timeslot within the same frame. The RX processing system 300 may convert the received signals into an I and Q representation for subsequent processing by, for example, a DSP.

The TX processing system 301 may comprise suitable logic, code, and/or circuitry that may enable transmitting signals corresponding to a plurality of communication protocols. For example, the TX processing system 301 may be adapted to receive I and Q representations of data to be communicated using a particular communication protocol, such as GSM. The TX processing system 301 may be further adapted to transmit other forms of transmissions, for example, Bluetooth, WLAN, and GPS. In this regard, the TX processing system 301 may comprise a plurality of filters and an RF power amplifier that may be configured so that the data may be transmitted utilizing the proper communication protocol. For example, the TX processing system 301 may comprise a band pass filter that may in one instance be centered around a carrier frequency associated with, for example, a cellular telephone tower 100, and in another instance may be centered around a carrier frequency associated with a Bluetooth signal from a computer 101. In this regard, the TX processing system 301 may be capable of transmitting RF signals corresponding to one communication protocol in one timeslot and another communication protocol in another timeslot within the same frame.

The oscillator 303 may comprise suitable logic, circuitry, and/or code that may enable generation of a local oscillator signal with a particular frequency. The local oscillator signal generated by the oscillator 303 may be input the RX processing system 300, the TX processing system 301 and the PLL 302. For example, the local oscillator signal may be used as the reference for a quadrature phase demodulator that may reside within the RX processing system 300. In this regard, the demodulator may shift the carrier frequency of a received RX signal down to a baseband carrier frequency so that the RX signal may be converted into an I and Q domain.

The PLL 302 may comprise suitable logic, circuitry and/or code that may enable generating an output frequency that may be a multiple of an input frequency. For example, the PLL 302 may be a fractional N synthesizer. In this regard, the PLL may effectively generate an output signal that may have a frequency that may be a non-integer multiple of the frequency of an input signal, such as the output of the oscillator 303. For example, if the oscillator 303 frequency is 1 MHz, the output of the PLL may be $$1 \text{ Mhz} * \frac{M}{N}$$

where M and N may be integers. In this way, the PLL may be configured to output a plurality of frequencies that may enable communicating information utilizing a plurality of communication protocols.

The control block 304 may comprise suitable logic, circuitry, and/or code that may enable configuration of a plurality of components within a SDR. For example, the control block 304 may comprise a plurality of registers. The registers may in turn be used to control the functionality of the various components that make up the SDR 305. In this regard, the control block 304 may be interfaced to a data bus connected to the DSP 304 so that the DSP 304 may read and write to registers within the control block 304. The control block 304 may also control which of a plurality of communication protocols may be used at any given time. For example, the control block 304 may comprise a timer for triggering events. The events may be used to reconfigure the various components of the SDR 305 at specific time. In an exemplary embodiment of the invention, a first event may be used to configure the SDR 305 so that a first timeslot may be used as GSM TX timeslot 203 (FIG. 2). A subsequent event may reconfigure the SDR 305 so that a second timeslot may be used, for example, as a Bluetooth TX timeslot 202 (FIG. 2). Having the controller perform this function may reduce the processing power requirements of the DSP 304.

The DSP 304 may comprise suitable logic, circuitry and/or code that may enable may enable sending and receiving I and Q data to and from the SDR 305 as well as suitable logic, circuitry and/or code that may enable configuring the SDR 305. In this regard, the DSP 304 may convert data from various sources into I and Q information and visa versa. The DSP 304 may maintain information to be transmitted in a buffer until the SDR 305 may be ready to send the information. In this regard, the DSP 304 may comprise a plurality of transmit and receive buffers 308 and 307 corresponding to a plurality of communication protocols.

An event from the control block 304 may be communicated to the DSP 306 that may indicate to the DSP 306 which type of I and Q data to send or receive. For example, the control block 304 may communicate an event to the DSP 304 indicating that the next time slot in, for example, a GSM frame may be used to transmit Bluetooth data. In this case, the DSP 306 may switch to a buffer 308 corresponding to Bluetooth data and begin communicating I and Q samples corresponding to Bluetooth data to the SDR 305 after the event occurs. The control block 304 may then communicate to the DSP 306 that the next slot may, for example, be utilized to communicate GSM TX information. The DSP 306 may then switch over to a buffer 308 corresponding to GSM TX data and output I and Q samples corresponding to that data to the SDR 305.

The antenna interface 311 may comprise suitable logic, circuitry, and/or code that may enable routing RX and TX signals corresponding to a plurality of communication protocols to a plurality of antennas. In this regard, the antenna interface 311 may route high frequency RX and TX signals to a high frequency antenna 309, and route low frequency RX and TX signals to a low frequency antenna 310. For example, communication protocols that operate in the 1 GHz band may be routed to the high frequency antenna and communication protocols that operate in the 50 MHz band may be routed to the low frequency antenna. The antenna interface 311 may be further adapted, for example, to simultaneously route TX signals corresponding a first frequency band to one antenna and RX signals corresponding to a second frequency band from a different antenna. For example, the antenna interface 311 may simultaneously route high frequency GSM TX signals from the TX processing system 301 to the high frequency antenna 309 and route low frequency NFC RX signals from the low frequency antenna 310 to the RX processing system 300.

Figure 3B:
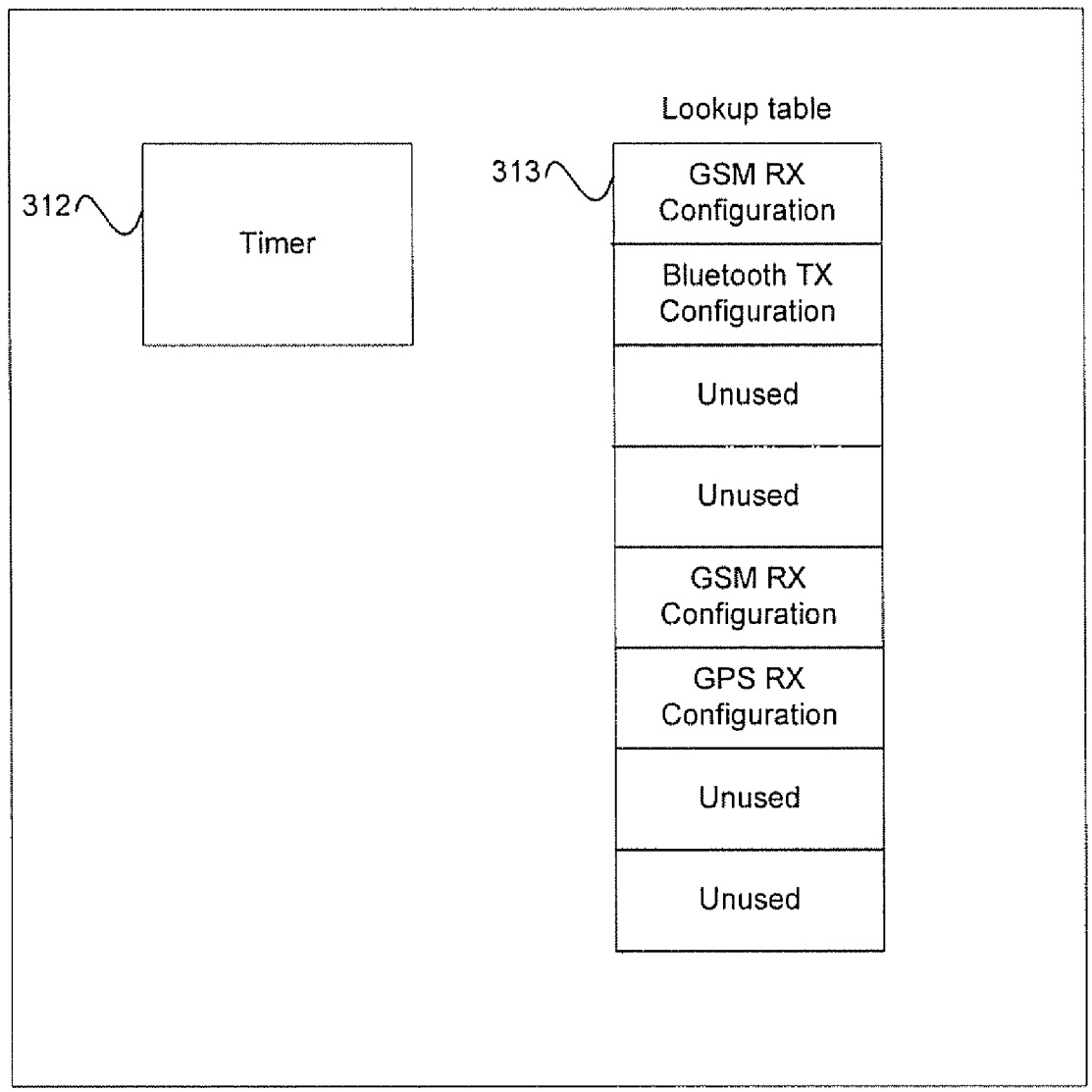
FIG. 3B is a block diagram of an exemplary control and data interface, in accordance with an embodiment of the invention.

FIG. 3B is a block diagram of an exemplary control and data interface, in accordance with an embodiment of the invention. Referring to FIG. 3B, there is shown a timer 312 and a lookup table 313. The timer may comprise suitable logic, circuitry, and/or code that may enable generation of periodic events. In this regard, the periodicity of the timer 312 and the timing of events generated by the timer may be configured by a processor, such as a DSP 306. For example, the DSP 306 may configure the timer 312 so that it may generate eight timeslot events evenly spaced over a period of 4.13 milliseconds.

The lookup table 313 may comprise suitable logic, circuitry, and/or code that may enable storing various hardware configuration settings corresponding to specific timeslots. For example, the first element in the lookup table 313 may comprise hardware configuration settings to be utilized during a first time slot in a TDMA frame. The subsequent elements may correspond to other timeslots within the same TDMA frame.

In operation, a DSP 306 (FIG. 3A) may configure the timer, for example, to generate 8 timeslot events over a period of, for example, 4.16 milliseconds. In addition, the DSP 306 may program the lookup table 313 with configuration settings for a plurality of hardware components. These hardware components may include the various hardware components within the SDR 305 (FIG. 3A) as well as the antenna interface 311. For example, during the first timeslot the control block 304 may output signals that may configure the SDR 305 to enable GSM TX and signals that may enable the antenna interface 311 to route the GSM signals from the SDR 305 to the high frequency antenna 309. During the second timeslot the control block 304 may output signals that may configure the SDR 305 to enable NFC RX and signals that may enable the antenna interface 311 to route the NFC signals from the low frequency antenna 310 to the RX input of the SDR 305.

The timer may then output the configuration settings stored in the lookup time for every timeslot. For example, during a first timeslot the GSM TX configuration settings may be output. During the second timeslot the NFC RX configuration settings may be output. In this manner, the control block 304 may autonomously reconfigure the various hardware components, such as the SDR 305 and the antenna interface 311. Reconfiguring the components for use with the various communication protocols may reduce the cost of the system because fewer components may be needed. This may result in a reduction in the board area required in a mobile device 102 (FIG. 1). Additionally, power consumption may be reduced because the components may not be spending as much time in an idle mode.

Figure 4:
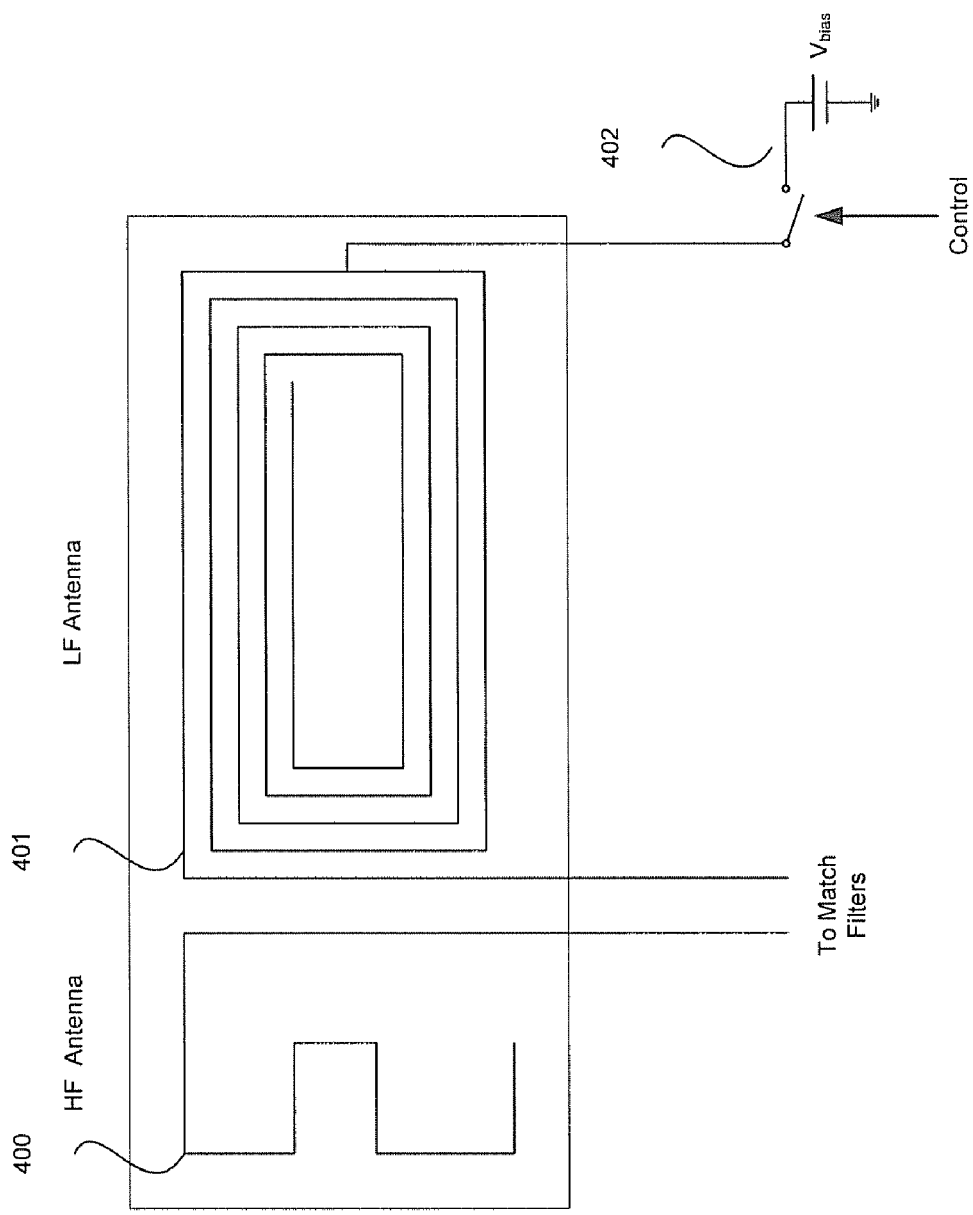
FIG. 4 is a block diagram of an exemplary antenna module, in accordance with an embodiment of the invention.

FIG. 4 is a block diagram of an exemplary antenna module, in accordance with an embodiment of the invention. Referring to FIG. 4, there is shown a high frequency antenna 400, a low frequency antenna 401 and an NFC voltage bias 402. The antenna module may be coupled to an antenna interface 311 (FIG. 3A), which may route high frequency RF signals to the high frequency antenna 400 and low frequency RF signals to the low frequency antenna 401.

The high frequency antenna 400 may be utilized for communication protocols such as WCDMA, HDSPA HSUPA, GSM, GPRS, EDGE, Wi-Fi, Bluetooth, GPS and DVB. The low frequency antenna 401 may be utilized for communication protocols such as FM Radio. In addition the low frequency antenna may be adapted to transmit and receive NFC signals that operate in, for example, the 13 MHz range. This may be accomplished by coupling NFC voltage bias 402 to the low frequency antenna as shown in FIG. 4.

Figure 5:
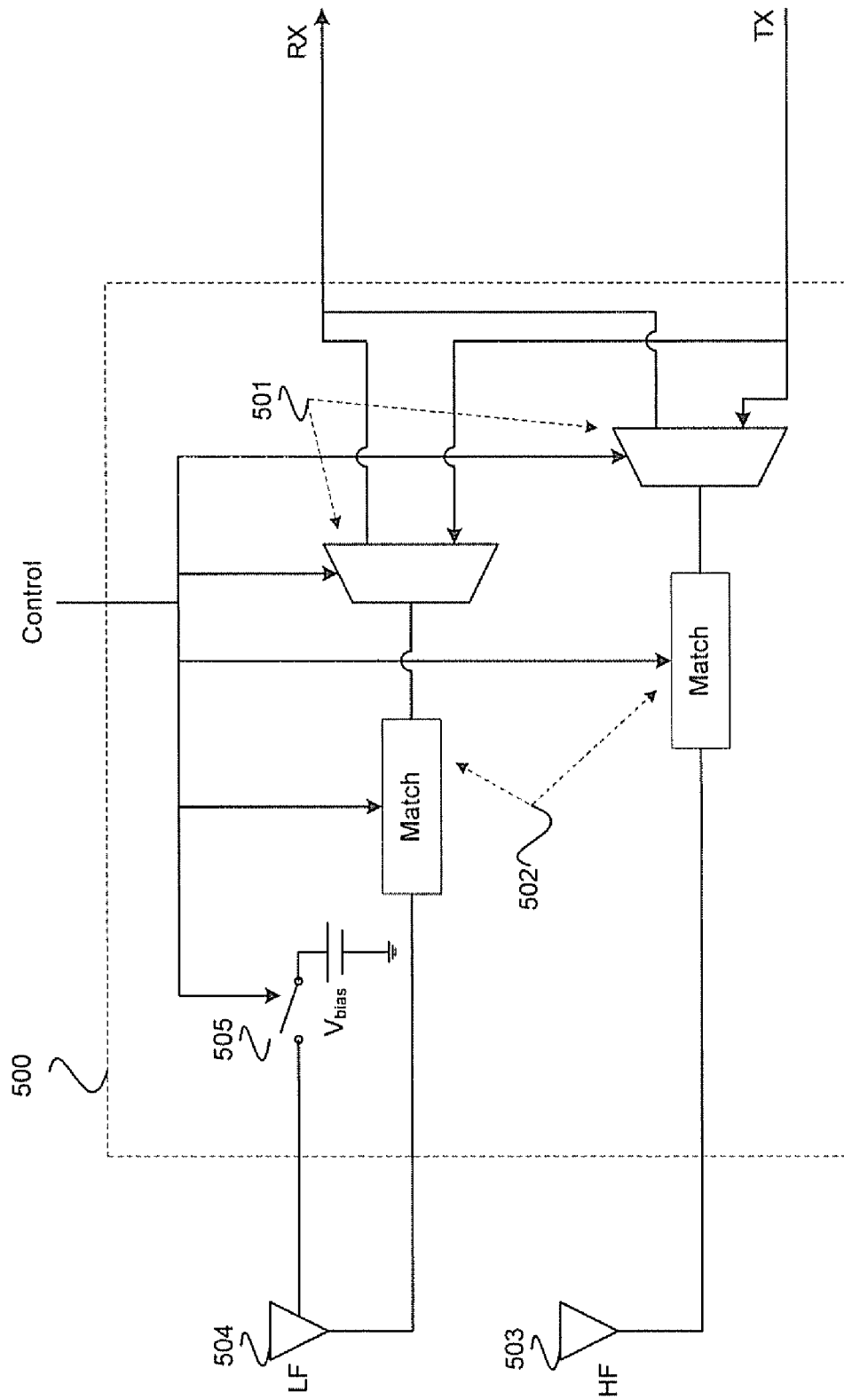
FIG. 5 is a block diagram of an exemplary antenna interface, in accordance with an embodiment of the invention.

FIG. 5 is a block diagram of an exemplary antenna interface, in accordance with an embodiment of the invention. Referring to FIG. 5, there is shown an antenna interface 500, a high frequency antenna 503, and a low frequency antenna 504. The antenna interface may comprise a plurality of match filters 500 and a plurality of multiplexers 501. A control signal from the control block 304 (FIG. 3A) may be used to configure the antenna interface 500 to route RF signals of varying frequencies to an antenna designed to handle the frequencies. For example, the control block 304 may configure the antenna interface 500 to route high frequency signals to a high frequency antenna 503 and low frequency signals to a low frequency antenna 504. In this regard, the high frequency signals may correspond to those signals utilized in communication protocols that operate in the 700 MHz band and greater. Those communication protocols may include, for example, WCDMA, HDSPA HSUPA, GSM, GPRS, EDGE, Wi-Fi, Bluetooth, GPS and DVB. The low frequency signals may correspond, for example, to FM signals and NFC signals, which may be below 700 MHz.

The multiplexers 501 may comprise suitable logic, circuitry, and/or code for that may enable routing RF signals. The multiplexers may be configured by the control block 304 in the SDR 305 (FIG. 3A). In this regard, the control block 304 may configure the multiplexers 501 so that for example, low frequency TX signals and high frequency RX signals may be simultaneously routed to the low frequency antenna 504 and high frequency antenna 503 respectively.

The match filters 502 may comprise suitable logic, circuitry and/or code that may enable dynamically tuning an antenna to a particular frequency. In this regard, there may be a match filter for each antenna. The match filters may comprise several capacitors and inductors, which may be switched in and out to create various filter responses. The state of these switches may be configured by the control block. 304 in the SDR 305.

In operation, the antenna interface 500 may be configured to route high frequency RF signals, such as those greater than 700 MHz, to a high frequency antenna 503 and those RF signals below 700 MHz to a low frequency antenna 504. The routing may, for example, be accomplished by configuring the multiplexers 501 appropriately. Additionally, the match filters 502 may be configured so that a given antenna may be optimally matched to the particular RF signal used by a communication protocol. For example, GSM RF signals may reside in the 900 MHz band. In this case, the match filter 502 associated with the high frequency antenna 503 may be configured to optimize the high frequency antenna 503 for 900 MHz operation. Bluetooth signals may reside in the 2.5 GHz band. In this case, the match filter 502 associated with the high frequency antenna 503 may be reconfigured to optimize the high frequency antenna 503 for 2.5 GHz operation. The match filter associated with the low frequency antenna 504 may be configured in a similar way to optimize the low frequency antenna for RF signals such as FM and NFC signals.

Figure 6A:
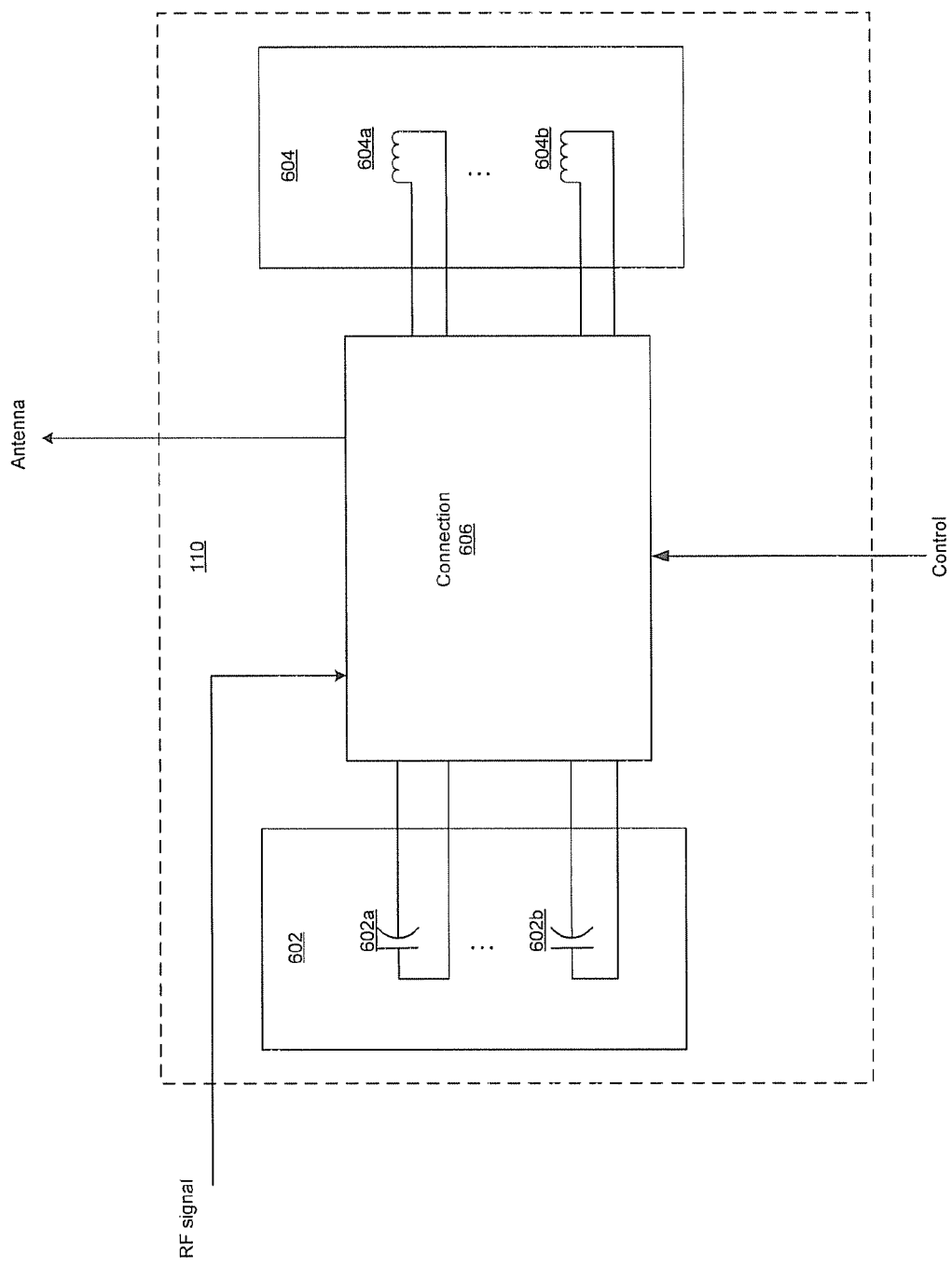
FIG. 6A is a block diagram illustrating an exemplary circuit that may be utilized for dynamically tuning an antenna, in accordance with an embodiment of the invention.

FIG. 6A is a block diagram illustrating an exemplary circuit that may be utilized for dynamically tuning an antenna, in accordance with an embodiment of the invention. Referring to FIG. 6A, there is shown a capacitive device block 602, an inductive device block 604, and a connection block 606. The capacitive device block 602 may comprise a plurality of capacitive devices 602a . . . 602b. Terminals of each capacitive device 602a . . . 602b may be coupled to the connection block 606. The inductive device block 604 may comprise a plurality of inductive devices 604a . . . 604b. Terminals of each inductive device 604a . . . 604b may be coupled to the connection block 606.

The connection block 606 may comprise suitable logic, circuitry, and/or code that may enable coupling any input terminal from the capacitive device block 602, the inductive device block 604, an antenna, and/or an RF signal to any other terminal from the capacitive device block 602, the inductive device block 604, an antenna, and/or an RF signal. In this regard, the antenna may correspond to either of the high or low frequency antennas 503 (FIG. 5) and 504 (FIG. 5) and the RF signal may be communicated to/from the SDR 305 (FIG. 3A) via the multiplexers 501 (FIG. 5). Accordingly, the connection block 606 may configure a subset of the capacitive devices 602a . . . 602b and a subset of the inductive devices 604a . . . 604b to form a circuit that couples the terminal from the antenna and the RF signal. For example, the subset may be a null subset to form a short circuit between the terminal from the antenna and RF signal. The subset of the capacitive devices 602a . . . 602b may also be a subset that comprises the set of capacitive devices 602a . . . 602b. Similarly, the subset of the inductive devices 604a . . . 604b may be a subset that comprises the set of inductive devices 604a . . . 604b. Accordingly, the subset of capacitive devices 602a . . . 602b may range from no capacitive device to all of the capacitive devices 602a . . . 602b in capacitive device block 602. Similarly, the subset of inductive devices 604a . . . 604b may range from no inductive device to all of the inductive devices 604a . . . 604b in inductive device block 604.

The capacitive device and/or inductive device circuit may be configured via the connection block 606, where control signals from the control block 304 (FIG. 3A) may indicate connection of the various terminals for the capacitive devices 602a . . . 602b, the inductive devices 604a . . . 604b, the antenna, and/or the RF signal. In some embodiments of the invention, the capacitor device block 602 may be on the same chip as the inductive device block 604. In other embodiments of the invention, the inductive device block 604 may be located separately from the on-chip capacitive device block 602.

In operation, control block 304 may configure the connection block 606, which may then configure the capacitive devices 602a . . . 602b and/or the inductive devices 604a . . . 604b to a particular circuit and connect the circuit to the terminal from the antenna and to the RF signal. For example, the control block 304 may communicate signals to the connection block 606 such that the connection block 606 may couple the capacitive device 602a in parallel to the inductive device 604a. First and second terminals of the resulting LC parallel circuit may be coupled to the antenna and to the RF signal, respectively. Accordingly, the impedance of the circuit formed by the inductive devices 604a . . . 604b and the capacitor devices 602a . . . 602b may be changed with different circuit configurations. A change in the impedance of the circuit formed by the inductive devices 604a . . . 604b and the capacitor devices 602a . . . 602b may result in a shift in the center frequency of the antenna and a change in the bandwidth of the antenna.

Figure 6B:
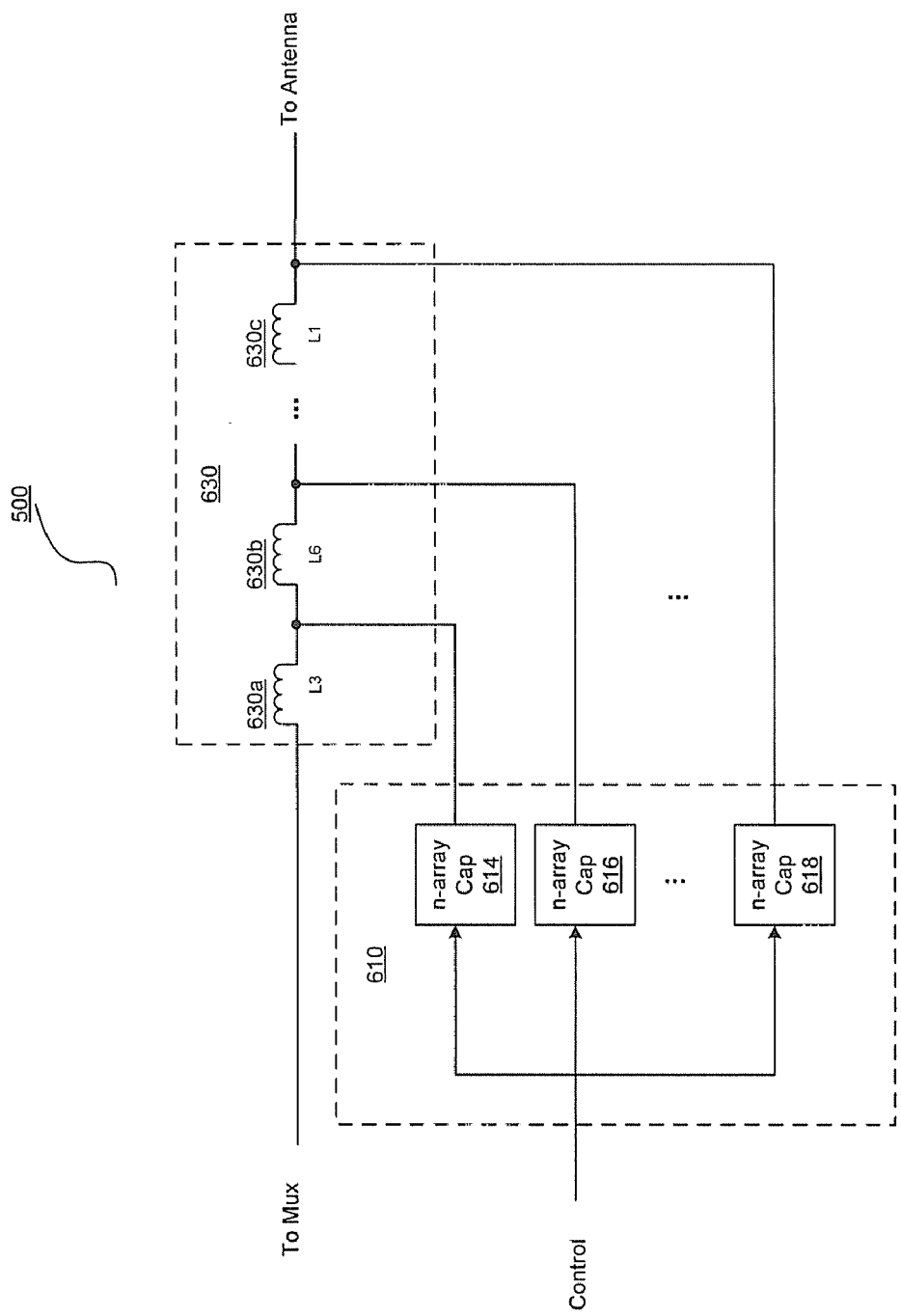
FIG. 6B is a block diagram illustrating an exemplary inductive circuit block that may be utilized for dynamically tuning an antenna, in accordance with an embodiment of the invention.

FIG. 6B is a block diagram illustrating an exemplary inductive circuit block that may be utilized for dynamically tuning an antenna, in accordance with an embodiment of the invention. Referring to FIG. 6B, in an embodiment of the invention, the antenna interface 500 (FIG. 5) may comprise a tuning control block 610 and an inductive circuit block 630. The tuning control block 610 may comprise a plurality of capacitor arrays 614, 616, . . . 618. The capacitance associated with each of the capacitor arrays 614, 616, . . . 618 may be selected by the control block 304 (FIG. 3A). In some embodiments of the invention, the capacitor arrays 614, 616, . . . 618 may be on the same chip as the inductive circuit block 620. In other embodiments of the invention, the inductive circuit block 620 may be located separately from the on-chip capacitor arrays 614, 616, . . . 618.

The capacitor arrays 614, 616, . . . 618 may each comprise a plurality of capacitive elements whose capacitances may be added to effectively form different capacitors with different capacitances. The capacitor array 614, 616, or 618 is described in more detail with respect to FIG. 2C. The inductive circuit block 620 may comprise a plurality of inductive elements that may be coupled to the capacitor arrays 614, 616, . . . 618.

The inductive circuit block 630 illustrates an exemplary configuration for the inductive elements of the inductive circuit block 620. The inductive circuit block 630 may comprise a plurality of inductive elements 630a, 630b, . . . 630c in series. Each of the capacitor arrays 614, 616, . . . , 618 may be coupled to a node in the inductive circuit block 630. For example, the capacitor array 614 may be coupled to the node between the inductors 620a and 620b, the capacitor array 616 may be coupled to the node between the inductors 620b and 620c, and the capacitor array 618 may be coupled to the node of the inductor 620c that is not coupled to the inductor 620b.

In operation, the control block 304 may configure the capacitive arrays 614, 616, . . . 618 for use with the inductive circuit block 630. The control block 304 may select a capacitance for each of the capacitive arrays 614, 616, . . . , 618 by enabling individual capacitive elements to be used for receiving RF signals from the antenna. Accordingly, the impedance of the circuit may be varied, and thereby cause the center frequency and/or the bandwidth associated with the antenna may be adjusted. Varying the impedance of the circuit may also impedance match the antenna to the antenna interface 500 (FIG. 5)

While the inductive devices 630*a*, 630*b*, ..., 630*c* in the inductive circuit block 630 may have been described as being in series, the invention need not be so limited. The inductive devices 630*a*, 630*b*, ..., 630*c* may be placed in other configurations, such as, for example, parallel, a pi, or star configuration, as well as any combination of serial, parallel, pi, or star configurations.

Figure 6C:
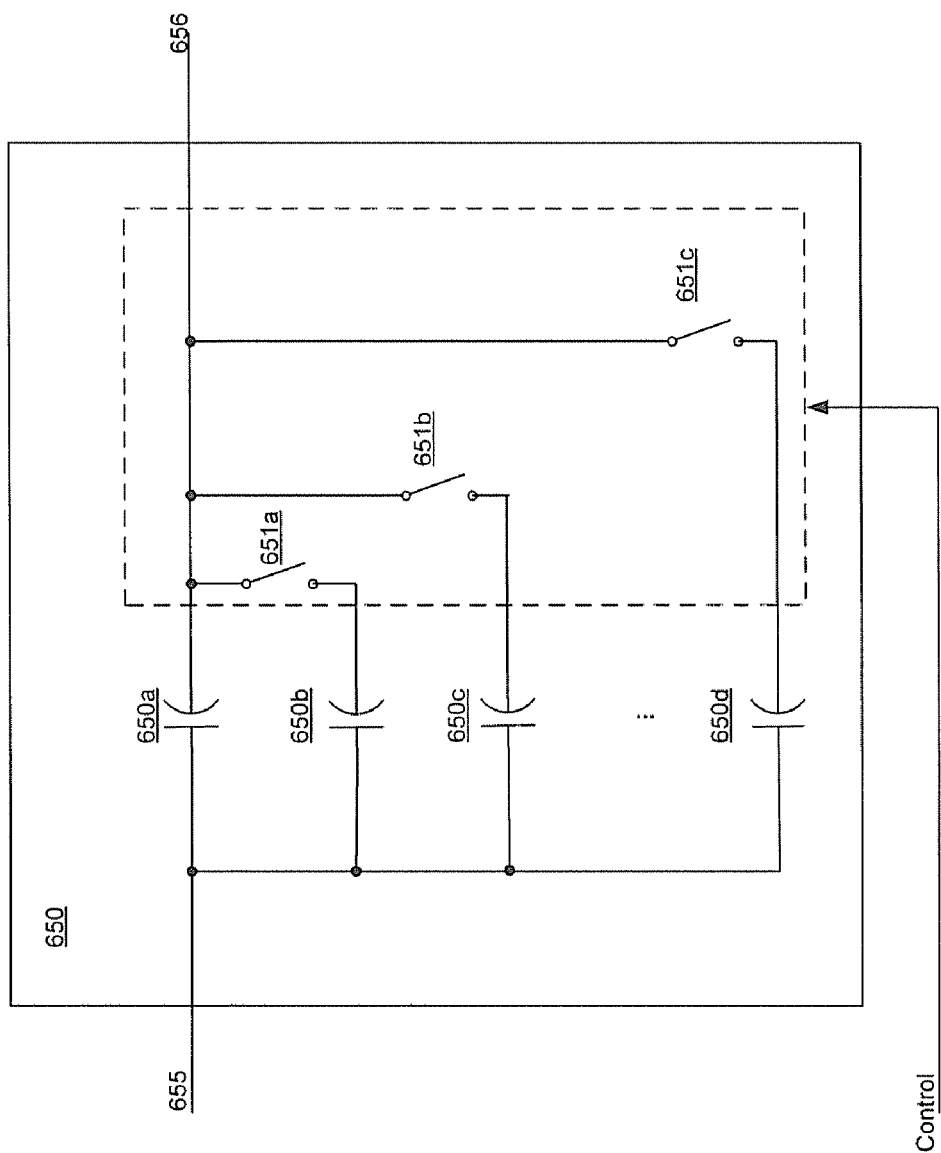
FIG. 6C is a block diagram illustrating an exemplary n-array capacitor block that may be utilized for dynamically tuning an antenna, in accordance with an embodiment of the invention.

FIG. 6C is a block diagram illustrating an exemplary n-array capacitor block that may be utilized for dynamically tuning an antenna, in accordance with an embodiment of the invention. Referring to FIG. 6C, there is shown the capacitive array 650, which may be similar to the capacitive arrays 614, 616, ..., 618. The capacitive array 650 may comprise the capacitive elements 650*a*, 650*b*, 650*c*, ... 650*d*, the switches 651*a*, 651*b*, ... 651*c*, and the output nodes 655 and 656.

The control block 304 (FIG. 3A) may control whether each of the switches 651*a*, 651*b*, ..., 651*c* may be open or closed via the control signals to the capacitive array 650. In instances where a switch may be open, the corresponding capacitive element 650*b*, 650*c*, ..., 650*d*, respectively, may not be part of a circuit that receives the RF signals from the antenna. Conversely, in instances where a switch may be closed, the corresponding capacitive element may be part of the circuit that receives the RF signals. Accordingly, the impedance of the circuit that receives the RF signals may be adjusted by opening or closing the switches 651*a*, 651*b*, ..., 651*c*. Adjusting the impedance in this manner may adjust the center frequency and/or the bandwidth of the antenna.

The control block 304 may receive one or more signals, for example, from the DSP 306 (FIG. 3A), which may indicate a status of the center frequency drift for the antenna. The receive signal from the DSP 306 may comprise, for example, detailed information regarding switch positions for each capacitive array 614, 616, ..., 618. Accordingly, the control block 304 may only need nominal processing to open or close the various switches 651*a*, 651*b*, ..., 651*c* in the capacitive arrays 614, 616, ..., 618. Other embodiments of the invention may communicate signal integrity indicators, for example, received signal strength indication and/or bit error rate, to the control block 304. The control block 304 may then process the signal integrity indicators to determine the center frequency drift, and proper adjustments that may be needed to compensate for the drift. The control block 304 may then open or close the various switches 651*a*, 651*b*, ..., 651*c* in the capacitive arrays 614, 616, ..., 618 to adjust the center frequency and/or the bandwidth. Still other embodiments of the invention may allocate processing between the DSP 306 and the control block 304. For example, the DSP 306 may determine the amount of drift or shift in the center frequency, while the control block 304 may determine a specific configuration for the capacitive arrays 614, 616, ..., 618 based on the amount of frequency compensation needed.

While the capacitive devices 650*a*, 650*b*, ..., 650*d* in the capacitive array 650 may have been described as being in parallel, the invention need not be so limited. The capacitive devices 650*a*, 650*b*, ..., 650*d* may be placed in other configurations, such as, for example, in parallel, in a pi, or star configuration, as well as any combination of serial, parallel, pi, or star configuration. Additionally, while the capacitive element 650*a* may be shown as always connected, other embodiments of the invention may allow the capacitive element 650*a* to be switched. Accordingly, the capacitive array 650 may be configured so that it may not be part of the circuit receiving the RF signals from the antenna. Notwithstanding its configuration, the capacitive array 650 may have the capability to dynamically switch the amount of capacitance that may be required to tune the center frequency to a desired value.

Additionally, FIG. 6B may indicate that the capacitive arrays 614, 616, ..., 618 may be coupled to fixed nodes of the inductive circuit block 630. However, the invention need not be so limited. For example, the terminals 655 and 656 of the capacitive array 650 may be programmably coupled to different locations. Accordingly, in one exemplary configuration, the capacitive array 614 may couple the terminal 655 to ground and the terminal 656 to the node between the inductive devices 620*a* and 620*b*. In another exemplary configuration, the capacitive array 614 may couple the terminal 655 to the node connected only to the inductive device 620*a* and the terminal 656 to the node between the inductive devices 620*a* and 620*b*.

Figure 7A:
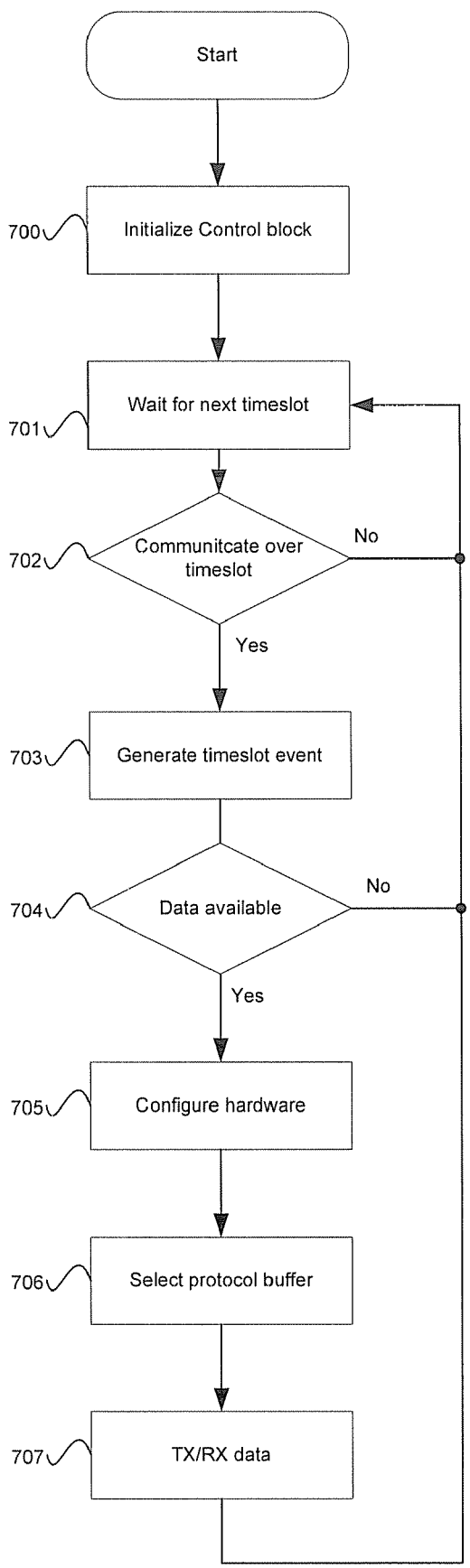
FIG. 7A is a block diagram illustrating an exemplary flow diagram of a system for sharing components in a time division multiplex wireless system, in accordance with an embodiment of the invention.

FIG. 7A is a block diagram illustrating an exemplary flow diagram of a system for sharing components in a time division multiplex wireless system, in accordance with an embodiment of the invention. Referring to FIG. 7A, at step 700 the DSP 306 (FIG. 3A) may initialize the control block 304 (FIG. 3A) in the SDR 305 (FIG. 3A). This may involve configuring a timer 312 (FIG. 3B) for generating timeslot events. In this regard, the DSP 306 may, for example, configure the timer 312 so that the timer 312 generates a specific number of timeslot events over a given period of time. For example, the DSP 306 may configure the timer 312 so that it generates 8 timeslot events evenly distributed over, for example, 4.16 milliseconds. The DSP 306 may also configure the control block 304 so that the control block 304 may control the various hardware components within the SDR 305. For example, the DSP 306 may configure the control block 304 so that a first timeslot may be used for GSM RX 201 (FIG. 2) and a second timeslot may be used for BT TX 202 (FIG. 2). For example, the control block 304 may comprise a lookup table 313 (FIG. 3B) of configuration settings. Each entry in the lookup table 313 (FIG. 3A) may contain various hardware configuration settings that may correspond to a particular timeslot within a TDMA frame, such as a GSM frame.

At step 701, the DSP 306 may wait for the next timeslot. At step 702, the control block 304 may send a timeslot event for a particular timeslot if, for example, that timeslot may have been enabled for communication. If the communication over the current timeslot has been enabled, the control block 304 may generate a timeslot event to the DSP 306 at step 703. Otherwise, step 701 may be repeated. At step 704, the DSP 306 may check if there may be any data to communicate. For example, in the case of data transmission, the DSP 306 may poll various buffers 308 (FIG. 3A) corresponding to various communication protocols to determine whether data needs to be communicated. In the case of data reception, the DSP 306 may check for I and Q data from the RX processing system 300 of the SDR 305. If no communication is necessary, then step 701 may be repeated.

At step 705, the control block 304 may configure various hardware components to enable communication for a particular protocol. For example, the current timeslot may have previously been configured for GSM RX 201. In this case, the control block 304 may configure, for example, various filters, a PLL 302, and a local oscillator 303 with values stored in a lookup table corresponding to the current timeslot. At step 706, the DSP 306 may communicate I and Q data to the TX processing system 301 of the SDR 305 in the case of data transmission, or the RX processing system 300 of the SDR 305 may communicate I and Q data to the DSP 306 in the case of data reception. After this, step 700 may be repeated.

Figure 7B:
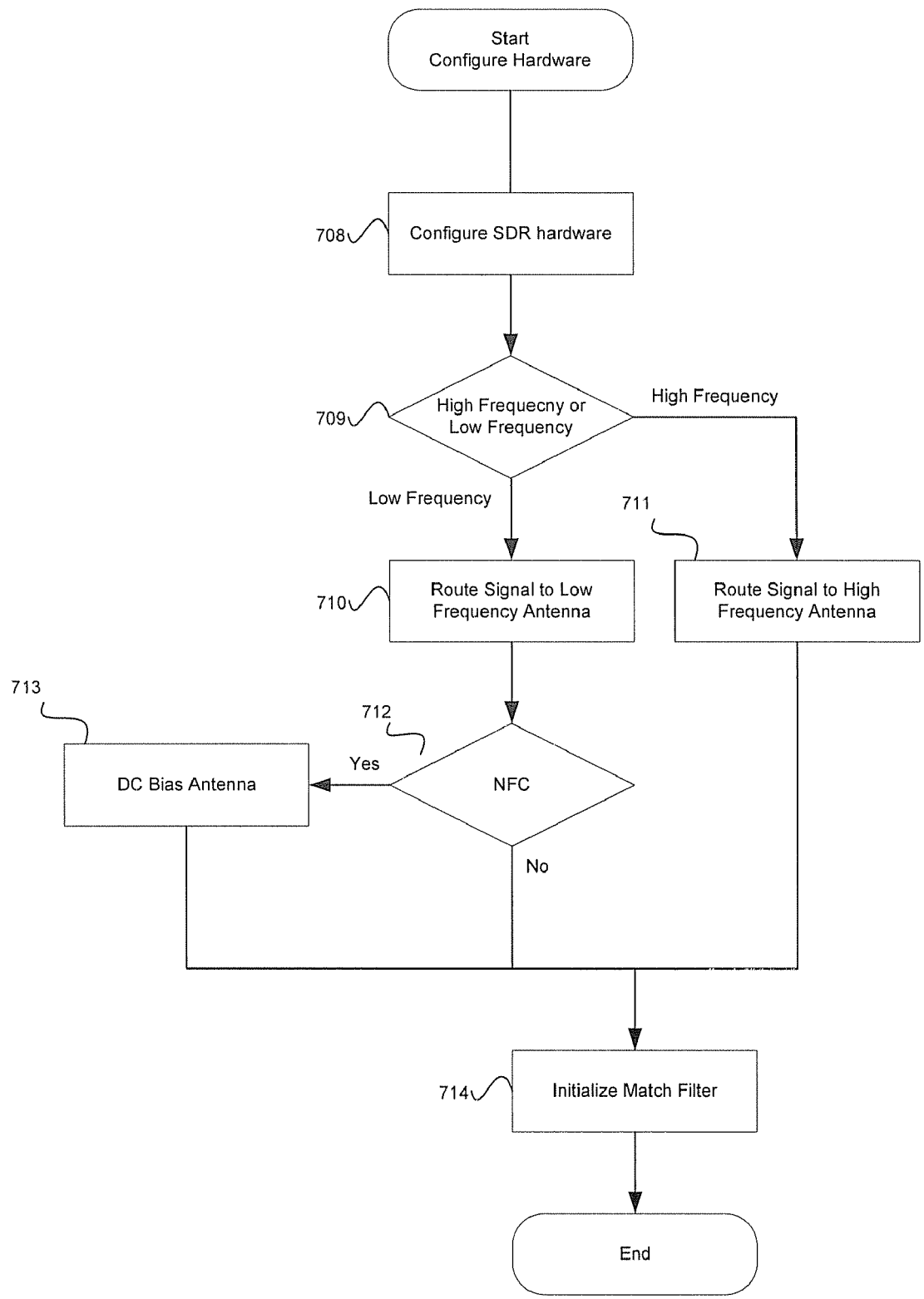
FIG. 7B is a block diagram illustrating an exemplary flow diagram of configuring components, in accordance with an embodiment of the invention.

FIG. 7B is a block diagram illustrating an exemplary flow diagram of configuring components, in accordance with an embodiment of the invention. At step 708, the control block 304 (FIG. 3A) may configure various hardware components to enable communication for a particular protocol. For example, the current timeslot may have previously been configured for GSM RX 201 (FIG. 2). In this case, the control block 304 may configure, for example, various filters, a PLL 302 (FIG. 3A), and a local oscillator 303 (FIG. 3A) with values stored in a lookup table corresponding to the current timeslot. At step 709, the control block 304 may configure the multiplexers 501 (FIG. 5) so that signal corresponding to various communication protocols may be routed to the appropriate antenna. At step 711, high frequency signals, for example, those above 600 MHz may be routed to the high frequency antenna. At step 710 low frequency signals, for example, those below 600 MHz may be routed to the low frequency antenna. For low frequency NFC signals a DC bias may be applied at step 713 to the low frequency antenna to enable NFC communication. At step 714, the selected antenna may be dynamically tuned to the appropriate communication protocol by configuring the match filter associated with the antenna as described above.

Figure 7C:
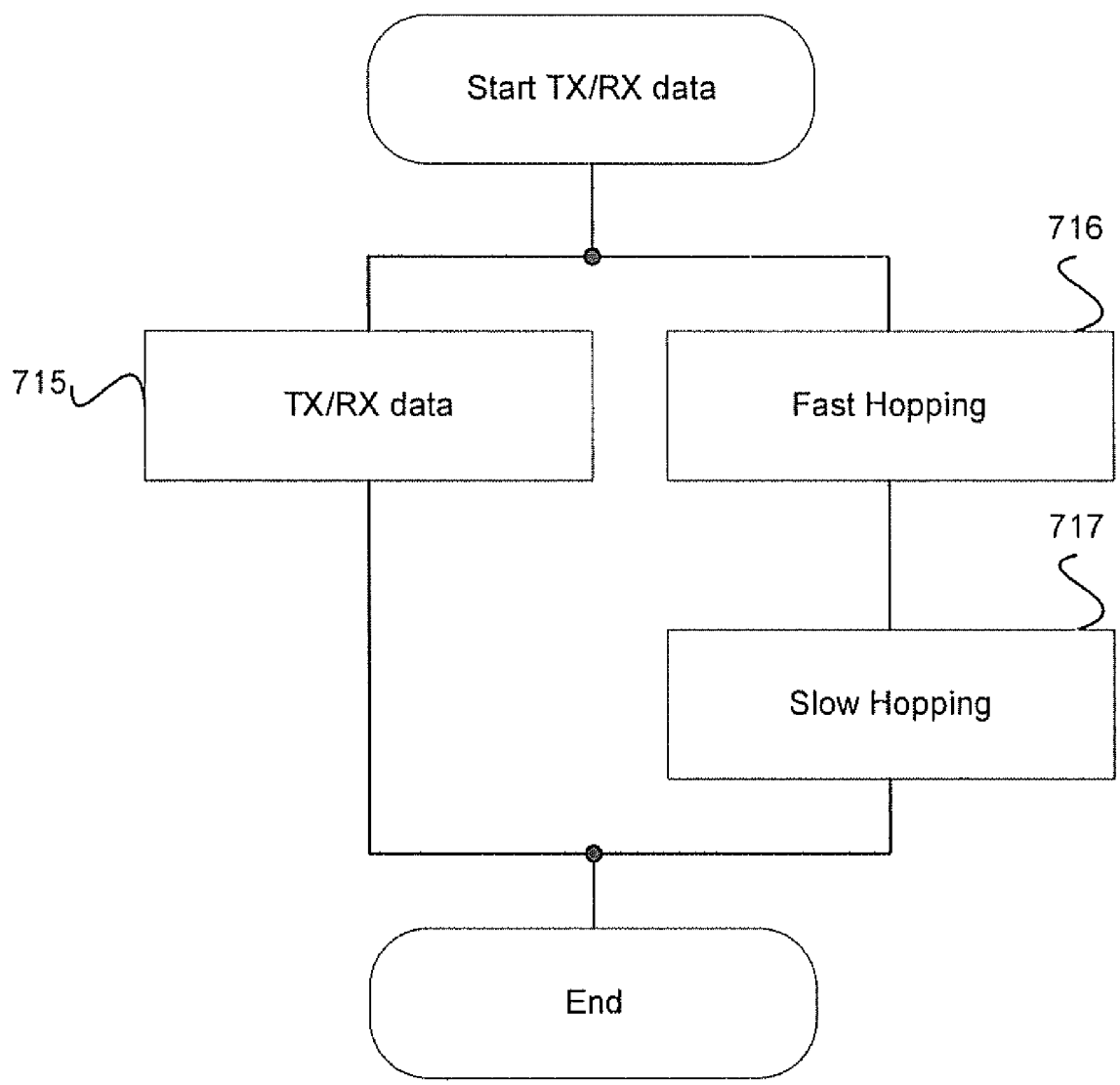
FIG. 7C is a block diagram illustrating an exemplary flow diagram of dynamically tuning an antenna, in accordance with an embodiment of the invention.

FIG. 7C is a block diagram illustrating an exemplary flow diagram of transmitting and receiving information while dynamically tuning an antenna, in accordance with an embodiment of the invention. At step 715, TX and RX information may be communicated via the appropriate antenna. Simultaneously, at step 716, the appropriate match filter may be further dynamically tuned so that the antenna may be more precisely tuned to a particular frequency of interest. Initially, this tuning may occur at a fast rate, so that a set of optimal matches may be found. That is, there may be a finite set of match configurations that may result in optimal antenna performance for the given communication protocol. At step 717, the match filter may alternate at a slower rate between the set of optimal matches found in step 716.

Figure 8A:
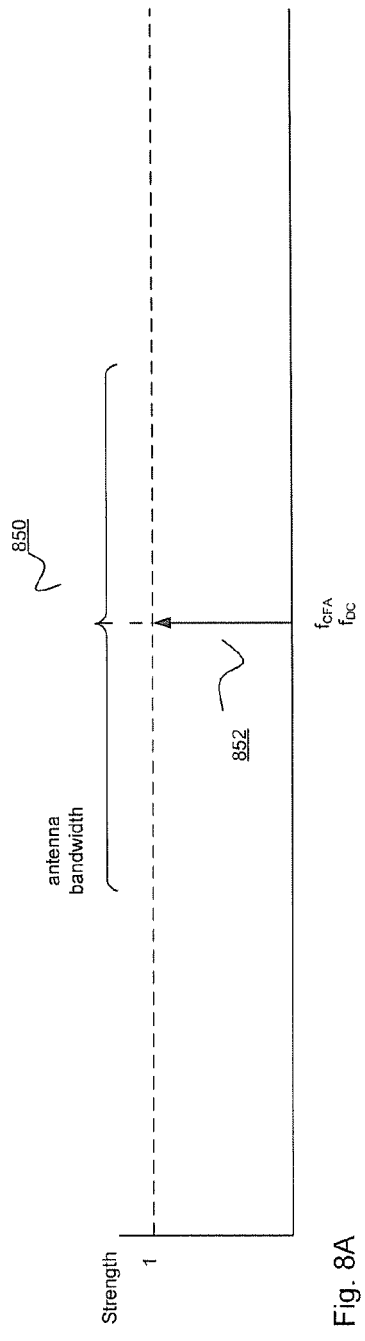
FIG. 8A is a chart illustrating exemplary signal strength for a channel at a center frequency of an antenna bandwidth, in accordance with an embodiment of the invention.

FIG. 8A is a chart illustrating exemplary signal strength for a channel at a center frequency of an antenna bandwidth, in accordance with an embodiment of the invention. Referring to FIG. 8A, there is shown a chart where the horizontal axis indicates frequency and the vertical axis indicates signal strength. The appropriate antenna 504 (FIG. 5) and 503 (FIG. 5) may be tuned to have a bandwidth 850 shown. For exemplary purposes, FIG. 8A may represent receiving signals in the FM radio bandwidth of approximately 88 MHz to 108 MHz. Additionally, for further exemplary purposes, the antenna bandwidth 850 may be less than the FM bandwidth of 88 MHz to 108 MHz. For example, the antenna bandwidth 850 may be 5 MHz. The actual bandwidth of the appropriate antenna 504 and 503 may be design and or implementation dependent, and may be changed by dynamically tuning the appropriate antenna 504 and 503. An exemplary description of dynamic tuning of an antenna is disclosed with respect to FIG. 2A, and is disclosed further in U.S. patent application Ser. No. 11/536,678, which is filed on even date herewith and is incorporated by reference in its entirety.

A desired channel 852 may be shown to be at frequency $f_{DC}$, where the frequency $f_{DC}$ may also be the actual center frequency $f_{CFA}$ for the appropriate antenna 504 and 503. Accordingly, the appropriate antenna 504 and 503 may be correctly tuned to receive the desired channel 852. For exemplary purposes, the received signal level of the desired channel 852 may be indicated to be a normalized signal strength of 1. Various embodiments of the invention may change the center frequency such that the actual center frequency $f_{CFA}$ may be the same as the desired channel frequency $f_{DC}$.

Figure 8B:
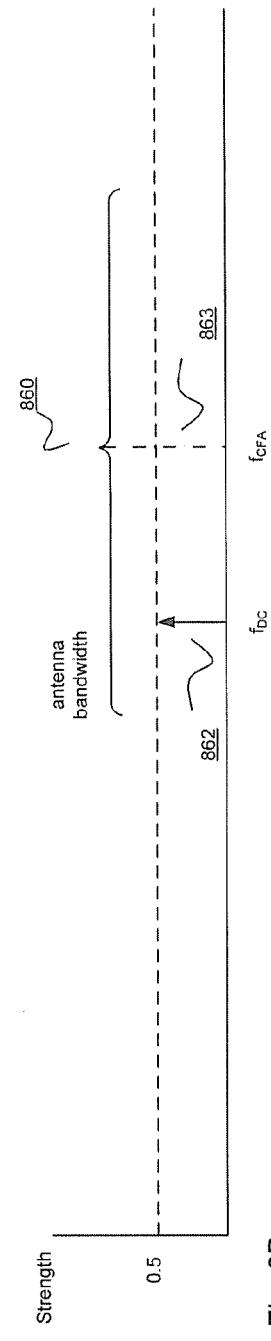
FIG. 8B is a chart illustrating exemplary signal strength for a channel offset from a center frequency of an antenna bandwidth, in accordance with an embodiment of the invention.

FIG. 8B is a chart illustrating exemplary signal strength for a channel offset from a center frequency of an antenna bandwidth, in accordance with an embodiment of the invention. Referring to FIG. 8B, there is shown a chart where the horizontal axis indicates frequency and the vertical axis indicates signal strength as in FIG. 8A. The appropriate antenna 504 (FIG. 5) and 503 (FIG. 5) may presently have an actual center frequency 863 of $f_{CFA}$ that may be different than the desired channel frequency $f_{DC}$. This may be due to environmental factors such as, for example, additional capacitance and/or inductance introduced by a user's hand holding on to the mobile device 102 (FIG. 1). Accordingly, while the center frequency of the appropriate antenna 504 and 503 may have been tuned to coincide with the desired channel $f_{DC}$, the user may have affected the antenna characteristics such that the center frequency and/or the antenna bandwidth 860 may have been changed. Accordingly, the signal strength of the desired channel 862 at the frequency $f_{DC}$ may be weaker than if it coincides with the actual center frequency 863 of $f_{CFA}$. The signal strength of the desired channel 862 may be denoted, for example, by the normalized signal strength of 0.5.

Figure 8C:
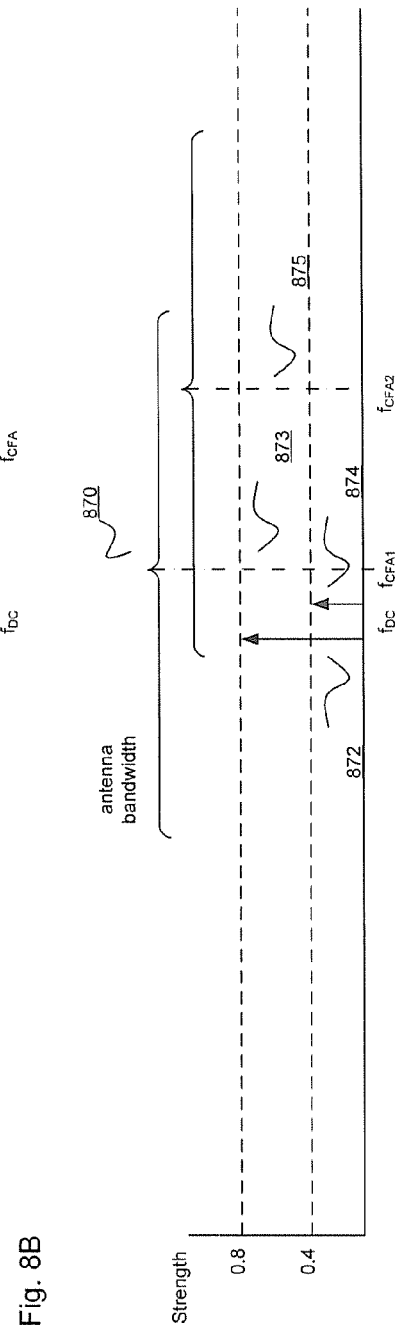
FIG. 8C is a chart illustrating exemplary signal strengths for a channel at a center frequency is changed due to antenna hopping, in accordance with an embodiment of the invention.

FIG. 8C is a chart illustrating exemplary signal strengths for a channel as a center frequency is changed due to antenna hopping, in accordance with an embodiment of the invention. Referring to FIG. 8C, there is shown a chart where the horizontal axis indicates frequency and the vertical axis indicates signal strength as in FIG. 8A. The mobile device 102 (FIG. 1) may not be able to determine the frequency offset of a desired center frequency for a desired channel to the actual center frequency. Accordingly, an embodiment of the invention may antenna hop by tuning the appropriate antenna 504 (FIG. 5) and 503 (FIG. 5) to change the center frequency of the appropriate antenna 504 and 503 to various frequencies.

For example, the desired channel frequency, and the desired center frequency, may be at the frequency $f_{DC}$ while the actual center frequency may have drifted to, for example, actual center frequency 863 of $f_{CFA}$. While the mobile device 102 may have no indication that the actual center frequency 863 is a different frequency than the desired center frequency, an antenna hopping algorithm may still be applied. Accordingly, signals for the desired channel may be received for various center frequencies. For example, the first antenna hop may configure the match filters 502 (FIG. 5) to a center frequency 873 at the frequency $f_{CA1}$. Since the center frequency 873 may be close to the desired channel frequency $f_{DC}$, the signal strength 872 for the desired channel for the center frequency $f_{CA1}$ may be a normalized value of 0.9.

The next antenna hop may configure the match filters 502 to a center frequency 875 at the frequency $f_{CA2}$. Since the center frequency 875 may be farther away from the desired channel frequency $f_{DC}$ than the center frequency 873 may be from the desired channel frequency $f_{DC}$, the signal strength 874 for the desired channel for the center frequency $f_{CA2}$ may be at a smaller normalized value of 0.4. Antenna hops may be configured so that adjacent antenna bandwidths may overlap. For example, the antenna bandwidth associated with the center frequency 873 may overlap a portion of the antenna bandwidth associated with the center frequency 875. By antenna hopping to a plurality of center frequencies, the DSP 304 (FIG. 3A), for example, may build a list of valid center frequencies that may allow adequate signal reception for a desired channel. This may be referred to as a slow antenna hop where the antenna hopping rate may be greater than an antenna hopping rate for a fast antenna hop.

As part of fast antenna hop, the mobile device 102 may aggregate signals received for a desired channel over a limited number of center frequencies. Signal aggregation may occur, for example, at the antenna interface 500 (FIG. 5) or the DSP 304. The aggregation may be achieved, for example, via voltage summing by an analog signal aggregator or by processing of digital baseband data by a digital signal aggregator or the DSP 114b. Accordingly, fast antenna hop may enable antenna hop at a rate that may be larger than the Nyquist sampling rate for the signal content of the desired channel being received. For example, if the desired channel is an analog FM channel, the Nyquist rate may be 36,000 KHz or more. Therefore, fast antenna hop may enable antenna hopping to a different center frequency every 28 microseconds or faster. The number of center frequencies used for fast antenna hop may be design and/or implementation dependent. The list of valid center frequencies used for fast antenna hop may be generated during slow antenna hop, and/or may be modified during fast antenna hop. The signal strength may also be measured, for example, during fast antenna hop. For example, if the signal strength for the desired channel is below the threshold that determines whether the signal strength is adequate, the DSP 304, for example, may remove the center frequency from the list of valid center frequencies that may be used.

A slow antenna hop may remain at a center frequency for a period of, for example, several milliseconds. Due to the length of time that signals for a desired channel are received during the slow antenna hop, the mobile device 102 may not aggregate signals for the desired channel during slow antenna hop. The list of valid center frequencies for a desired channel may comprise, for example, those center frequencies where the average power level for the desired channel may be above a threshold value. The threshold value may be, for example, pre-determined. The power averaging over a relatively longer period of time may reduce distortions due to instantaneous spikes or dips in signal levels. Other embodiments of the invention that receive digital signals may, for example, determine a bit error rate for a desired channel at different antenna center frequencies to determine adequacy of signals for a desired channel at those center frequencies.

In this manner, the mobile device 102 may be able to receive signals for the desired channel from different center frequencies associated with the appropriate antenna 504 and 503 at various times. Accordingly, mobile device 102 may be able to compensate for center frequency drift without knowing the specific amount of drift. Other embodiments of the invention may use an antenna hopping algorithm selectively. For example, an antenna hopping algorithm may be used when the received signal strength is less than a threshold value.

Various embodiments of the invention may implement different usage of antenna hopping, such as, for example, slow antenna hop and fast antenna hop. For example, fast antenna hop may be used when a desired channel has sufficient number of center frequencies, for example, four, in the list of valid center frequencies. Another embodiment of the invention may only use one center frequency if the power level of the desired channel for that center frequency is strong enough. Another embodiment of the invention may start with slow antenna hopping to update the list of valid center frequencies, and then switch to fast antenna hopping after, for example, making a pre-determined number of antenna hops.

Figure 8D:
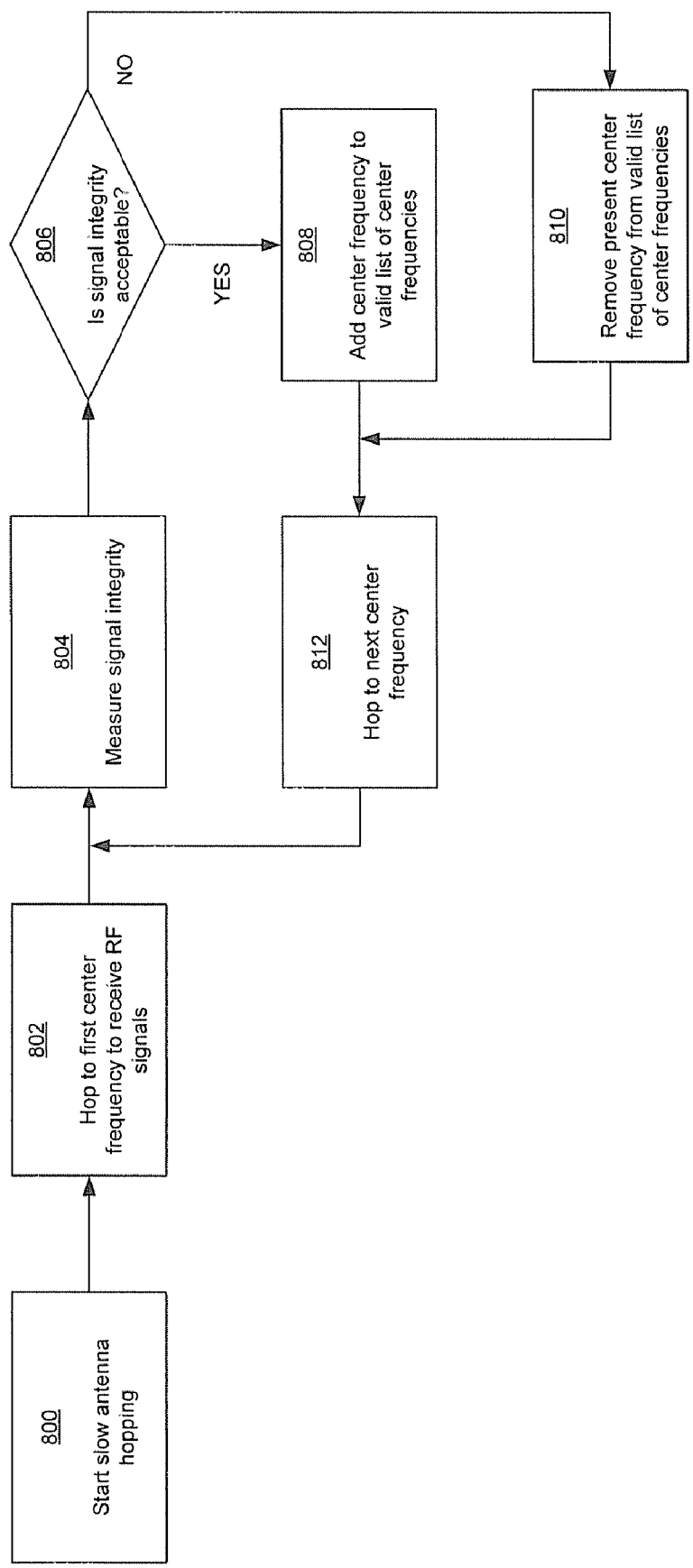
FIG. 8D is a flow diagram of exemplary steps for slow antenna hopping, in accordance with an embodiment of the invention.

FIG. 8D is a flow diagram of exemplary steps for slow antenna hopping, in accordance with an embodiment of the invention. Referring to FIG. 9D, there is shown steps 800 to 812. In step 800, the DSP 304 (FIG. 3A), for example, may start a slow antenna hop for the appropriate antenna 504 (FIG. 5) and 503 (FIG. 5) by configuring the match filters 502 (FIG. 5) for the first center frequency. In step 802, the match filters 502 may be tuned to the first center frequency and signals from the desired channel may be received and processed by, for example, the antenna interface 500 (FIG. 5).

In step 804, the antenna interface 500 may, for example, measure the received signal strength to determine signal integrity. The received signal strength value may be communicated to, for example, the DSP 304. In step 806, the DSP 304 may compare the received signal strength value to, for example, a pre-determined signal strength value that may be stored, for example, in a memory. If the received signal strength value is, for example, greater than or equal to the pre-determined signal strength value, the next step may be step 808. Otherwise, the next step may be step 810.

In step 808, the DSP 304 may determine whether the present center frequency may be part of the list of valid center frequencies for the desired channel. If the present center frequency is not part of the list of valid center frequencies, the present center frequency may be added to the list of valid center frequencies for the desired channel. The next step may be step 812 where the DSP 304 may reconfigure the match filters 502 to antenna hop to the next center frequency, where an antenna bandwidth for the next center frequency may overlap with the antenna bandwidth for the present center frequency. The next step may be step 804.

In step 810, the DSP 304 may determine whether the present center frequency may be part of the list of valid center frequencies for the desired channel to. If so, this center frequency may be deleted from the list of valid center frequencies for the desired channel. The nest step may be step 812.

Figure 8E:
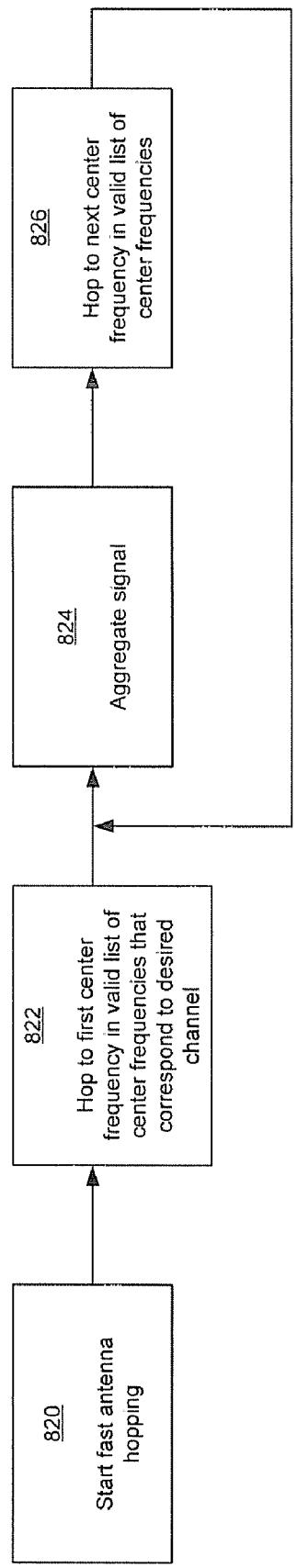
FIG. 8E is a flow diagram of exemplary steps for fast antenna hopping, in accordance with an embodiment of the invention.

FIG. 8E is a flow diagram of exemplary steps for fast antenna hopping, in accordance with an embodiment of the invention. Referring to FIG. 8E, there is shown steps 820 to 826. In step 820, the DSP 304 (FIG. 3A), for example, may start a fast antenna hop for the appropriate antenna 504 (FIG. 5) and 503 (FIG. 5) by configuring match filters 502 (FIG. 5) for a first center frequency from the list of valid center frequencies for a desired channel. The list of valid center frequencies may be stored, for example, in a memory. In step 822, match filters 502 may be tuned to the first center frequency and signals from the desired channel may be received and processed by, for example, the antenna interface 500 (FIG. 5). The In step 824, the received signal may be aggregated. For example, if there four center frequencies are used for fast antenna hopping, the received signals for the four center frequencies may be aggregated. For example, the aggregation may occur at the antenna interface 500 via voltage summing by an analog signal aggregator of the received signals for the desired channel for the center frequencies used in fast antenna hopping. After hopping to the four center frequencies, signals may be aggregated for the next four antenna hops. Aggregation may also occur at the DSP 304 by converting the received signals that correspond to the four center frequencies to four digital samples and processing the four digital samples to generate a single digital sample. The digital signal processing may be executed by a digital signal aggregator DSP 304.

In step 826, the DSP 304, for example, may continue the fast antenna hop for the appropriate antenna 504 and 503 by configuring the match filters 502 for a next center frequency from the list of valid center frequencies for a desired channel. If the present center frequency is the last of, for example, the four center frequencies used for fast antenna hopping, then the next center frequency may be the first of the four center frequencies. Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Another embodiment of the invention may provide a machine-readable storage, having stored thereon, a computer program having at least one code section executable by a machine, thereby causing the machine to perform the steps as described herein for processing signals in a communications system. For example, scheduling of high frequency signals communicated from a high frequency antenna 309 to use certain timeslots in a TDM frame 200, such as GSM, and scheduling of low frequency signals communicated from a low frequency antenna 310 to use other timeslots in the same TDM frame 200 may be controlled by code such as software and/or firmware.

Dynamically tuning the high frequency antenna 309 for communicating, for example, WCDMA, HDSPA, HSUPA, GSM, GPRS, EDGE, Wi-Fi, Bluetooth, GPS, or DVB signals may be controlled by code such as software and/or firmware. Dynamically tuning the low frequency antenna for communicating, for example, FM radio or NFC signals, which may be enabled by applying a DC bias voltage 402 to the low frequency antenna 310, may be controlled by code such as software and/or firmware.

An optimal filter configuration for compensating the high frequency antenna 309 and low frequency antenna 310 for changes in frequency may be stored to a memory by code such as software and/or firmware. The high frequency antenna 309 and low frequency antenna 310 may be compensated later using the stored optimal configuration for compensating changes in frequency by code such as software and/or firmware.

Another embodiment may provide a system with one or more circuits that may enable the system to perform the steps as described herein for communicating information in a multi-antenna system. For example, scheduling of high frequency signals communicated from a high frequency antenna 309 to use certain timeslots in a TDM frame 200, such as GSM, and scheduling of low frequency signals communicated from a low frequency antenna 310 to use other timeslots in the same TDM frame 200 may be controlled by circuitry such as a processor and memory.

Dynamically tuning the high frequency antenna 309 for communicating, for example, WCDMA, HDSPA, HSUPA, GSM, GPRS, EDGE, Wi-Fi, Bluetooth, GPS, or DVB signals may be controlled by circuitry such as a processor and memory. Dynamically tuning the low frequency antenna for communicating, for example, FM radio or NFC signals, which may be enabled by applying a DC bias voltage 402 to the low frequency antenna 310, may be controlled by circuitry such as a processor and memory.

An optimal filter configuration for compensating the high frequency antenna 309 and low frequency antenna 310 for changes in frequency may be controlled by circuitry such as a processor and memory. The high frequency antenna 309 and low frequency antenna 310 may be compensated later using the stored optimal configuration for compensating changes in frequency by circuitry such as a processor and memory.

Yet another embodiment of the invention may provide a method for performing the steps as described herein for communicating information in a multi-antenna system. For example, scheduling of high frequency signals communicated from a high frequency antenna 309 to use certain timeslots in a TDM frame 200, such as GSM, and scheduling of low frequency signals communicated from a low frequency antenna 310 to use other timeslots in the same TDM frame 200 may be controlled by such a method.

Dynamically tuning the high frequency antenna 309 for communicating, for example, WCDMA, HDSPA, HSUPA, GSM, GPRS, EDGE, Wi-Fi, Bluetooth, GPS, or DVB signals may be controlled by such a method. Dynamically tuning the low frequency antenna for communicating, for example, FM radio or NFC signals, which may be enabled by applying a DC bias voltage 402 to the low frequency antenna 310, may be by such a method.

An optimal filter configuration for compensating the high frequency antenna 309 and low frequency antenna 310 for changes in frequency may by such a method. The high frequency antenna 309 and low frequency antenna 310 may be compensated later using the stored optimal configuration for compensating changes in frequency by such a method.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communications system, the method comprising:
   scheduling signals within different frequency ranges communicated from different antennas to use different timeslots in a single TDM frame; and
   reconfiguring a filter in the communications system using at least one stored parameter, wherein the signals within different frequency ranges are scheduled and the filter is reconfigured according to a communication protocol change that is triggered by a specific event.

2. The method according to claim 1 comprising, dynamically tuning a first antenna to a frequency band corresponding to one of said different frequency ranges for a first communication protocol.

3. The method according to claim 1 comprising, dynamically tuning a second antenna to a frequency band corresponding to one of said different frequency ranges for a first communication protocol.

4. The method according to claim 1 comprising, storing at least one optimal filter configuration for compensating at least one of said different antennas for changes in frequency.

5. The method according to claim 4 comprising, compensating said at least one of said different antennas for changes in frequency based on said stored at least one optimal filter configuration.

6. The method according to claim 1 comprising, applying a DC bias voltage to at least one of said different antennas to enable NFC.

7. The method according to claim 1, wherein at least one of said different antennas is adapted to operate at frequencies greater than or equal to 600 MHz.

8. The method according to claim 1, wherein at least one of said different antennas is adapted to operate at frequencies below 600 MHz.

9. The method according to claim 1, wherein at least one of said different antennas is adapted to communicate at least one of:
WCDMA, HDSPA, HSUPA, GSM, GPRS, EDGE, Wi-Fi, Bluetooth, GPS, or DVB signals and at least one other of said different antennas is adapted to communicate at least one of: FM radio or NFC signals.

10. The method according to claim 1, wherein said TDMA frame is a GSM frame.

11. A non-transitory machine-readable storage having stored thereon, a computer program having at least one code section for processing signals in a communications system, the at least one code section being executable by a machine for causing the machine to perform steps comprising:
scheduling signals within different frequency ranges communicated from different antennas to use different timeslots in a single TDM frame; and
reconfiguring a filter in the communications system using at least one stored parameter, wherein the signals within different frequency ranges are scheduled and the filter is reconfigured according to a communication protocol change that is triggered by a specific event.

12. The machine-readable storage according to claim 11, wherein said at least one code section comprises code that enables dynamically tuning a first antenna to a frequency band corresponding to one of said different frequency ranges for a first communication protocol.

13. The machine-readable storage according to claim 11, wherein said at least one code section comprises code that enables dynamically tuning a second antenna to a frequency band corresponding to one of said different frequency ranges for a first communication protocol.

14. The machine-readable storage according to claim 11, wherein said at least one code section comprises code that enables storing at least one optimal filter configuration for compensating at least one of said different antennas for changes in frequency.

15. The machine-readable storage according to claim 14, wherein said at least one code section comprises code that enables compensating said at least one of said different antennas for changes in frequency based on said stored at least one optimal filter configuration.

16. The machine-readable storage according to claim 11, wherein said at least one code section comprises code that enables applying a DC bias voltage to at least one of said different antennas to enable NFC.

17. The machine-readable storage according to claim 11, wherein at least one of said different antennas is adapted to operate at frequencies greater than or equal to 600 MHz.

18. The machine-readable storage according to claim 11, wherein at least one of said different antennas is adapted to operate at frequencies below 600 MHz.

19. The machine-readable storage according to claim 11, wherein at least one of said different antennas is adapted to communicate at least one of:
WCDMA, HDSPA, HSUPA, GSM, GPRS, EDGE, Wi-Fi, Bluetooth, GPS, or DVB signals and at least one other of said different antennas is adapted to communicate at least one of: FM radio or NFC signals.

20. The machine-readable storage according to claim 11, wherein said TDMA frame is a GSM frame.

21. A system for processing signals in a communications system, the system comprising:
one or more circuits that enable scheduling signals within different frequency ranges communicated from different antennas to use different timeslots in a single TDM frame; and
the one or more circuits operate to reconfigure a filter in the communications system using at least one stored parameter,
wherein the signals within different frequency ranges are scheduled and the filter is reconfigured according to a communication protocol change that is triggered by a specific event.

22. The system according to 21, wherein said one or more circuits enables dynamically tuning a first antenna to a frequency band corresponding to one of said different frequency ranges for a first communication protocol.

23. The system according to 21, wherein said one or more circuits enables dynamically tuning a second antenna to a frequency band corresponding to one of said different frequency ranges for a first communication protocol.

24. The system according to 21, wherein said one or more circuits enables storing at least one optimal filter configuration for compensating at least one of said different antennas for changes in frequency.

25. The system according to 24, wherein said one or more circuits enables compensating said at least one of said different antennas for changes in frequency based on said stored at least one optimal filter configuration.

26. The system according to 21, wherein said one or more circuits enables applying a DC bias voltage to at least one of said different antennas to enable NFC.

27. The system according to 21, wherein at least one of said different antennas is adapted to operate at frequencies greater than or equal to 600 MHz.

28. The system according to 21, wherein at least one of said different antennas is adapted to operate at frequencies below 600 MHz.

29. The system according to 21, wherein at least one of said different antennas is adapted to communicate at least one of: WCDMA, HDSPA, HSUPA, GSM, GPRS, EDGE, Wi-Fi, Bluetooth, GPS, or DVB signals and at least one other of said different antennas is adapted to communicate at least one of: FM radio or NFC signals.

30. The system according to 21, wherein said TDMA frame is a GSM frame.

* * * * *